United States Patent [19]

Gnuechtel

[11] Patent Number: 4,719,575

[45] Date of Patent: Jan. 12, 1988

[54] METHOD AND APPARATUS FOR CONTROLLING WEB HANDLING MACHINERY

[75] Inventor: Herman C. Gnuechtel, Arlington Heights, Ill.

[73] Assignee: Web Printing Control Co., Inc., Elk Grove Village, Ill.

[21] Appl. No.: 650,832

[22] Filed: Sep. 14, 1984

[51] Int. Cl.[4] ........................ G06F 15/46; B65H 23/18

[52] U.S. Cl. .................................... 364/469; 101/248; 226/28; 250/548; 250/561

[58] Field of Search ........................ 364/468, 469, 471; 226/2, 3, 27–31; 356/399–401, 429; 250/548, 559–561, 571; 318/640; 101/248, 181, DIG. 12

[56] References Cited

U.S. PATENT DOCUMENTS

| | | | |
|---|---|---|---|
| 4,243,925 | 1/1981 | Gnuechtel | 318/603 |
| 4,264,957 | 4/1981 | Pautzke | 101/248 X |
| 4,361,260 | 11/1982 | Hanlan | 364/469 X |
| 4,484,522 | 11/1984 | Simeth | 364/469 X |
| 4,528,630 | 7/1985 | Sargent | 364/469 |
| 4,532,596 | 7/1985 | Pugsley | 364/469 |

*Primary Examiner*—Joseph Ruggiero
*Attorney, Agent, or Firm*—Welsh & Katz, Ltd.

[57] ABSTRACT

A control system and method for acquiring and automatically maintaining a register condition for successive repeat lengths of a moving web relative to a cut-off apparatus or the like in a web operating apparatus of the type which includes an adjusting means for adjusting the web. The system operates in manual and automatic mode, and while in the manual mode an image profile of the web is digitized, stored and processed to locate at least one suitable control mark. After the register condition is obtained and at least one control mark indentified during the manual mode, the system can be switched to automatic mode to automatically maintain the registration condition using at least one control mark to detect deviation from the register of the web.

55 Claims, 6 Drawing Figures

METHOD AND APPARATUS FOR CONTROLLING WEB HANDLING MACHINERY

This invention relates generally to registration control and more particularly relates to a microprocessor based system and method for acquiring and maintaining a register condition in a web operating apparatus of the type which has a work applying means on the web at successive repeat lengths during movement thereof and which has a web adjusting means for advancing or retarding the position of the repeat lengths relative to the work applying means.

Register control systems have been used in the prior art for many years for the purpose of automatically presenting a web, such as paper in a printing press or the like, to a work applying means which may comprise a pair of cutting rolls that cut the paper at the proper location. Once the apparatus has been set up by the operator to cut the web at the proper location (i.e. the register condition), which occurs at each of successive repeat lengths of the web, the control system usually varies an upstream adjusting means which is usually in the form of a compensating roller which can be moved in a manner whereby the web location where the cut is to occur can be advanced or retarded so that the register condition can be maintained. These systems generally employ a scanner which detects one or more dark lines or other indicia on the web which occurs one or more times during each repeat length or signature, as well as an encoding generator which is operably connected to one of the cutting rolls of the work applying means so that it generates tach pulses for each revolution of the counter (often referred to as "once around" tach pulses). The relative occurrence of the tach pulse is then compared with the occurrence of the mark signal that is derived from the scanner to determine if the position of the web as it is presented to the cutter has moved relative to its register or proper position.

Many prior art systems employ an encoder to produce a "once around" pulse which after the register condition has been acquired during set up, must be adjusted to occur at the proper location for comparison with the mark signal that is produced by the scanner detecting the mark from the web. The encoders that have been utilized in many prior art systems have employed various techniques to properly position the encoder so that the one or more pulses occur at the proper time and have employed structural adjustment techniques to properly position the components which detect the pulses in the encoder. For example, a magnet which results in the generation of the "once around" tach signal for each revolution of the encoder shaft has been physically repositioned to provide the signal at the proper rotational position. Other systems have required movement of light sources and photo receivers therein, as well as rotating the commutator thereof. Still other devices have employed fiber optic cables to fixed sources and receivers with the fiber optic cables being capable of being repositioned. Virtually all of these techniques are intended to generate a "once around" tach pulse, i.e. one pulse for each revolution of the encoder, wherein the pulse occurs at the same time as the mark signal is generated by the scanner so that when the encoder is set up there is no difference between the occurrence of the mark signal and the tach pulse. Any subsequent advancement or retardation of the web during operation will result in a difference between the occurrence of these two signals which can be used to make a correction. Systems have been used which generate a few thousand pulses per revolution in addition to the "once around" pulse, but the greater number of pulses are used only to determine the magnitude of the error between the occurrence of the mark signal and the "once around" tach signal.

Most of these prior art systems employ a complex encoder reference generator which must be manipulated during the setting up of the apparatus. An advanced prior art system avoids the use of a "once around" tach signal and employs a conventional encoding reference generator which merely produces a predetermined number of pulses together with an indication of the direction of rotation of the encoder shaft.

However, all such prior art systems are primarily suited for systems in which a special mark is placed on the web. This is unfortunately wasteful of valuable material. Further, these prior art systems require manual adjustment of scanner sensitivity to compensate for changes in the scanner light source, dirt on the scanner, etc. The present invention presents a radical departure from the prior art by analyzing the existing signature of the web to automatically locate a mark and generate a register condition as well as automatically adjust the effective sensitivity of the scanner.

Accordingly, it is an object of the present invention to provide an improved register control system and method which presents a significant improvement over the prior art register control systems and which does not experience many of the problems of those systems.

It is another object of the invention to provide an improved system that is operable in manual and automatic modes, wherein a mark is automatically chosen and the register condition is set up while in a manual mode and upon switching to an automatic mode the register condition is automatically maintained.

Another object of the present invention is to provide an improved register control system and method which digitizes and stores an entire signature and uses a microprocessor to process the signature to determine a suitable mark for use in maintaining a register condition.

It is still another object of the present invention to provide an improved register control system and method that automatically adjusts scanner sensitivity.

Briefly, according to one embodiment of the invention, a method is provided for acquiring and maintaining a register condition for successive repeat lengths of a web that is acted on by work applying means of a web operating apparatus which also has adjusting means for adjusting the position of said repeat length relative to said work applying means. The method comprises scanning the web and digitizing a plurality of successive data points to form a digital map of a cross-section of the web image, and then storing the digitized data points. The stored data points are processed to locate contrast changes which meet predetermined minimum conditions and the located contrast changes are reduced to a predetermined number of control marks and stored in a memory. The location of at least one control mark is then detected for each successive repeat length and the difference between the initial location of at least one control mark and the detected location of the respective control mark is measured and an error signal is generated in response to said difference for each successive repeat length. The adjusting means is then driven to advance or retard the position of said repeat lengths in response to the error signal.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

DETAILED DESCRIPTION OF THE PREFERRED EMBODIMENT

Figure 1:
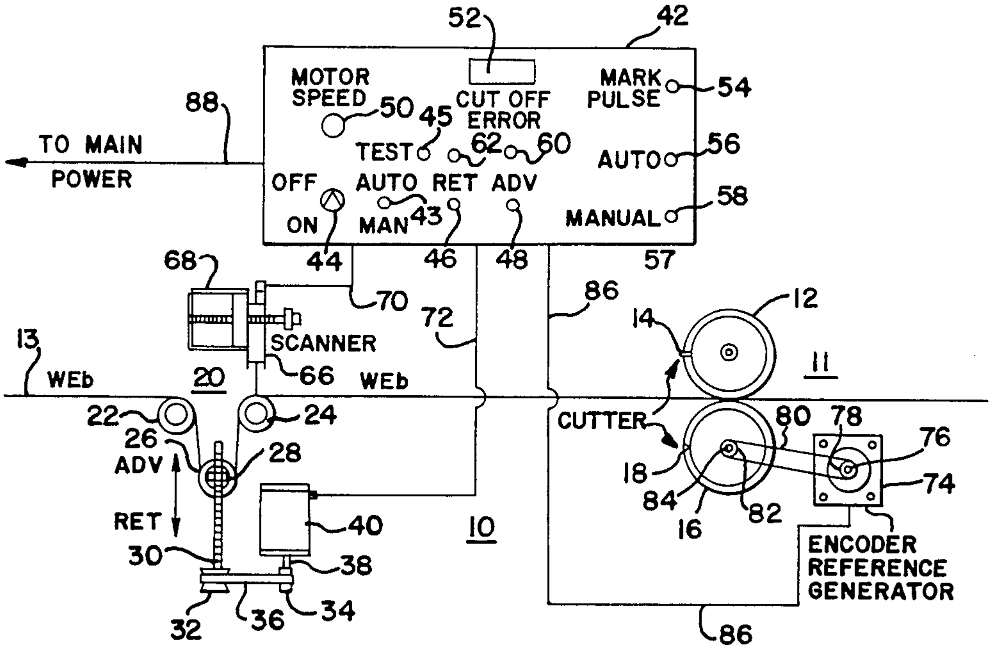
FIG. 1 is a diagrammatic illustration of a register control system shown in conjunction with a web operating apparatus and embodying the present invention.

Referring to FIG. 1 there is shown a diagrammatic illustration of a control system embodying the present invention together with a portion of a web operating apparatus 10 which is specifically illustrated to have a web cutter 11 and position adjusting mechanism 20. The control system of the invention provides compensation for minor changes in the web operating apparatus registration, primarily changes due to circumferential stretch of the web. While the control system described herein is in conjunction with a web operating apparatus that utilizes these components, it should be understood that the control system described herein is useful in other applications.

The web operating apparatus 10 shown in FIG. 1 has a cutter mechanism 11, which includes an upper roller 12 having a knife 14 and a lower roller 16 having an anvil 18 which cooperates with the knife 14 to make a transverse cut of the web 13 for each rotation of the rollers 12 and 16. The rollers 12 and 16 are driven in synchronism and are accordingly sized so that the transverse cuts are made on the web 13 at each repeat length or signature as desired.

The web operating apparatus 10 also includes web adjusting equipment 20, which includes rollers 22 and 24 to guide the web 13, the web 13 passing over the third roller 26 that can be vertically adjusted to either advance or retard the position of the web 13 that is presented to the cutter apparatus 10. The compensating roller 26 has its shaft journalled at opposite ends in member 28 which has a threaded aperture that is cooperatively connected to a threaded bolt 30 which can be rotated in opposite directions to raise or lower the member 28 and therefore the roller 26. The shaft 30 has a pulley 32 which is linked to a pulley 34 by belt 36, although it can be a chain or the like, with the pulley 34 being attached to the drive shaft 38 of a correction motor 40, as shown.

The system of the present invention is shown to include a control panel 42 having an off-on switch 44, a manual-automatic switch 43, test switch 45, retard and advance push buttons 46 and 48, a correction motor speed adjustment knob 50, a digital display 52, together with a mark pulse indicator 54, an automatic mode indicator 56, a manual mode indicator 58 and advance and retard indicators 60 and 62, respectively. A set of four sixteen-position selection switches (not shown) are also provided to permit presetting constants that are dependent upon the particular web operating apparatus. A scanner 66 is mounted just above the web 13 adjacent to the roller 24 and is mounted by a structure indicated generally at 68 so that it can be vertically adjusted relative to the web 13 for the purpose of optimizing the signals that are detected by it. The signals that are generated by the scanner are sent to the control system circuitry (see FIGS. 2 and 3) housed behind the control panel 42 via conductors 70, and similarly, cable 72 extends to the correction motor 40 for operating the motor to advance or retard the web 13. The system includes an encoding generator 74 (hereinafter referred to as the shaft encoder or merely the encoder) that has an encoder shaft 76 with a pulley 78 that is operatively connected to the lower roller 16 via a belt 80 that is carried by a pulley 82 on the shaft 84 of the roller 16. The size of the pulleys 84 and 78 are determined such that a one to one ratio of rotation is established, i.e., for each rotation of the roller 16, there will be a single rotation of the shaft 76 of the encoder 74. The output signals that are generated by the encoder 74 are sent to the control system circuitry via lines 86 and power for the system is supplied to the control circuitry by lines 88. It should be noted that since the encoder shaft is essentially measuring very precise positions, the connection between the shafts 74 and 84 should be optimized and it often preferred that they be directly coupled together.

In operating the system shown in the drawings, an operator will set the switch 43 in the manual position which enables him to actuate either the advance or retard switches 46 and 48 which will cause the correction motor 40 to operate and either advance or retard the position of the web 13 that is presented to the cutter 14 and anvil 18 so as to produce the cut at the desired location. After the operator has made the proper adjustment to obtain the cut at the desired location with respect to the signature or successive repeat lengths of the web, the system electronics scans the signature, digitizing and storing 3600 data points thereby creating a digital map of a cross section of the entire signature image for the repeat length of the web 13. In an alternative approach, only a substantial portion of repeat length is scanned, where a substantial portion is a portion sufficient to ensure identification of a suitable control mark. The system then processes this digital information to automatically adjust the scanner sensitivity and analyzes the digital data to determine a suitable control mark from the signature to be used for automatic control of the web operating apparatus 10. Once at least one control mark has been determined, the operator can switch the switch 43 to the automatic setting and it will automatically maintain the register condition during operation provided the web 13 does not physically slip a large distance relative to the rollers 12 and 16. In the event of such large slippage occurring, the system also offers a manual intervention capability of incrementally advancing or retarding the web 13 during automatic operation. This can be done by merely depressing the advance or retard push buttons 46 and 48, with the amount of movement being determined by the duration of the pressing of the appropriate push button by the operator. When the system is being set up in manual mode, the indicator light 48 provides an indication that the scanner is sensing marks and determining an appropriate control mark or other indicia on the web. The marks that are detected by the scanner and stored must be processed and analyzed to determine whether they satisfy certain requirements regarding isolation from one another, slope of contrast changes, etc. After the operator has determined that one or more valid control marks have been determined, he can then switch to automatic operation and the system will thereafter operate automatically to maintain the register condition.

When the system is operating in the automatic mode a digital display 52 will provide an indication as to the amount of error that is present. It should be noted that when the web is moving very rapidly and has shifted so that the signature has moved relative to the cutter apparatus 10, several cuts may occur before the adjusting mechanism 20 can regain the register condition and the digital display 52 indicates this progress and whether an error is present. Prior to display of the error, the error signal is normalized relative to the repeat length of the web operating apparatus such that each count of the displayed value represents a fixed length of the web.

Figure 2:
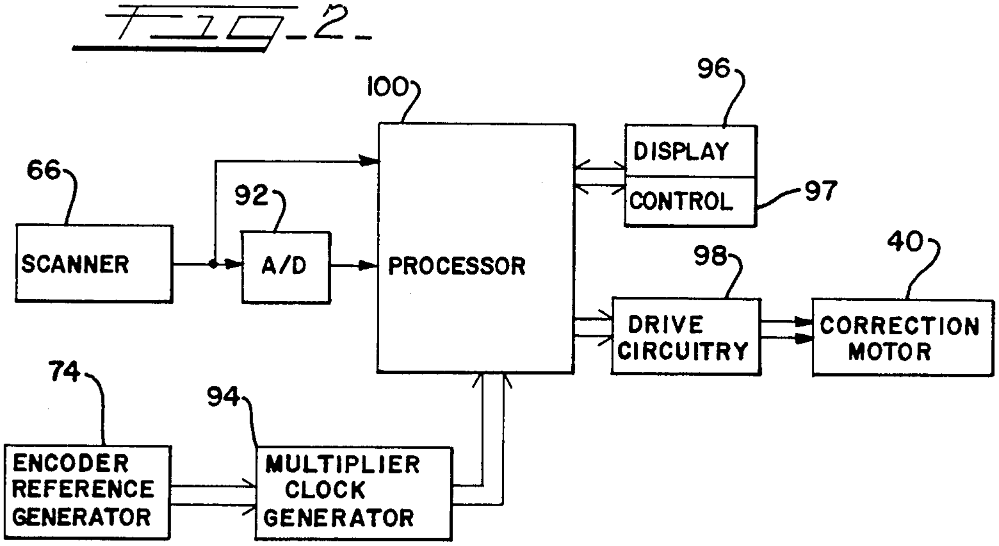
FIG. 2 is a generalized block diagram of the electronic circuitry of a specific embodiment of a control system according to the present invention.
Figure 3:
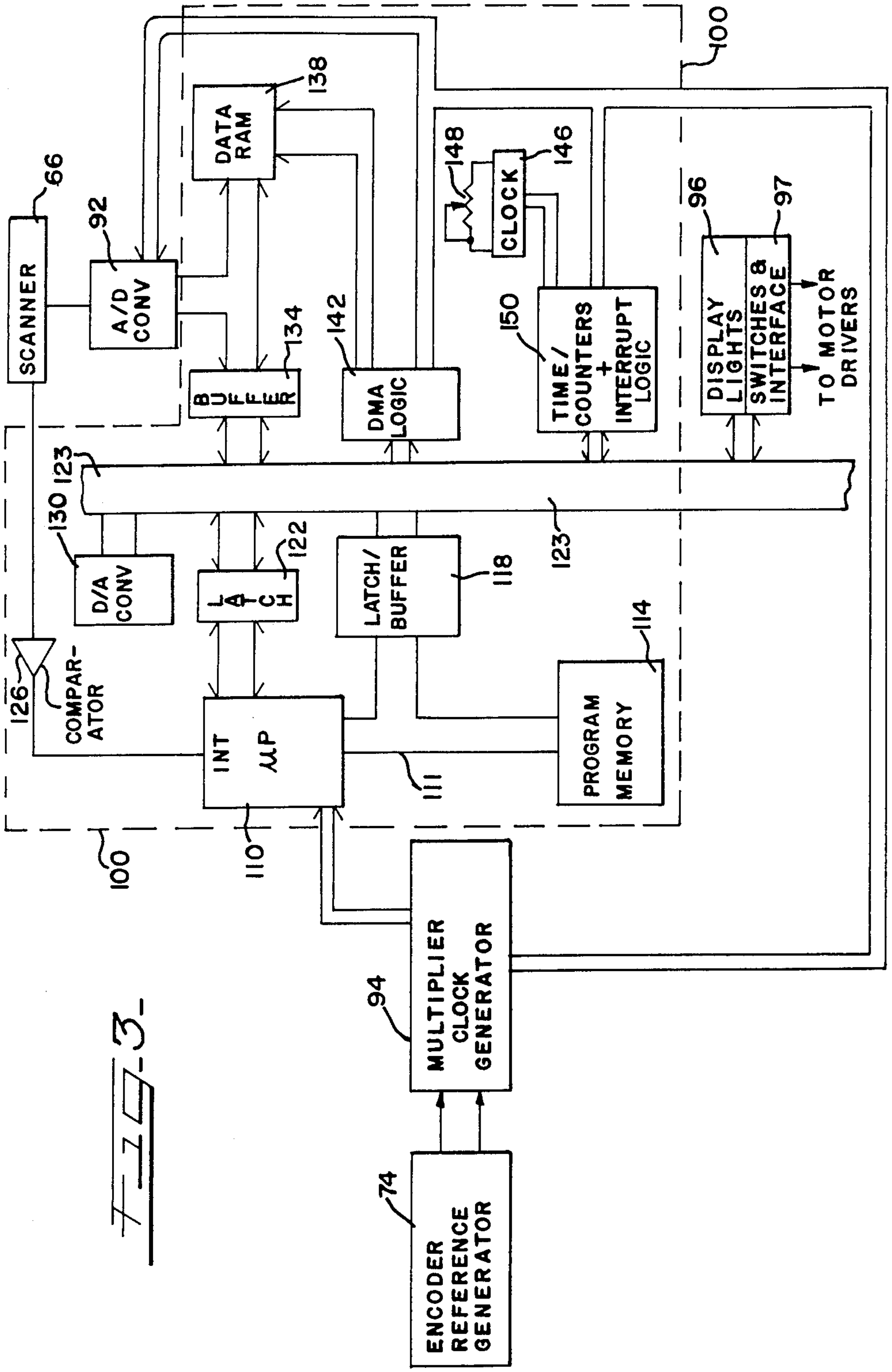
FIG. 3 is a detail block diagram of the electronic circuitry of a specific embodiment of a control system according to the present invention.

For a more detailed description of the operation of the system, reference is made to FIGS. 2 and 3. FIG. 2 is a general block diagram illustrating the electronic circuitry that is incorporated in the system to perform the various system functions in accordance with the invention. The scanner 66 detects a reflected light level through the use of a light source which is directed toward the web 13 and a light sensitive photo-diode which detects the reflected light from the web 13 and provides a signal to an analog to digital (A/D) converter 92 and to a processor 100, as shown. The scanner 66 effectively measures a change in light level, for example, a change from a light level to a dark level which would occur due to presence of a dark line or other indicia that is printed on the web. The A/D converter 92 samples and digitizes (e.g., eight bits per sample in the preferred embodiment) the signal from the scanner at a rate of 3600 samples per repeat length and couples the resulting digital data to the processor 100. The processor 100 is the control logic for the system comprised primarily of a programmed microprocessor (e.g., an Intel 8031), random access memory (e.g., 5511's) and related logic circuitry (for detail see FIGS. 3–6). The processor 100 stores the digital data from the A/D converter 92 in random access memory (RAM) and processes the data to locate suitable marks and determine the effective scanner sensitivity. A computer program listing of a program for use in the embodiment illustrated in FIGS. 3–6 is attached hereto and is hereby incorporated as part of this specification.

An encoder 74 (e.g., 700 series shaft encoder manufactured by Disc Instruments, Inc., Costa Mesa, Calif.) produces an output comprising two 1800 cycle square waves per revolution of its shaft, where its shaft it connected to the shaft 84 of the roller 16 as shown in FIG. 1. The two square waves produced are 90 degrees out of phase with each other such that one wave leads the other by 90 degrees during clockwise rotation, and the opposite phase relationship exists for counter clockwise rotation. Thus the output of encoder 74 contains position and direction information. These output signals are applied, as shown, to a multiplier clock generator 94 which produces a set of clock signals at a rate of 3600 pulses per repeat length including direction dependent signals which are coupled, as shown, to the processor 100. These clock signals are utilized by the processor 100 to accumulate a count of pulses to maintain a precise indication of shaft position, i.e., a position count. The processor 100 also utilizes the clock signals for other purposes including the determination of the primary direction of rotation automatically, the instantaneous direction of rotation, and information used for incrementing and decrementing the position count to keep track of position changes due to rotation in either direction. Also coupled to the processor 100 are output display devices 96 (e.g., lights, seven segments displays, etc.) and input controls 97 (e.g., push button switches, selection switches) such as are shown in FIG. 1 with reference to the control panel 42. In addition, output control signals are coupled from the processor 100 to the correction motor drive circuitry 98 to provide control of the correction motor 40, as shown.

In operation, the system 10 is started by an operator who powers up the system and places it in a manual mode by activating the manual switch 43. In the manual mode the operator can advance or retard the position of the web by activating the advance 48 or retard 46 switches to produce the cut at the desired location. After the proper adjustment has been made to obtain the cut at the desired location, the processor 100 begins the scan of the web signature, storing 3600 samples digitized by the A/D converter 92 from the scanner 66 and clocked in by a clock signal produced by the multiplier clock generator 94. These data samples are stored in random access memory (RAM) within the processor 100 (see FIG. 3). Once a complete set of 3600 samples has been stored, providing a profile map of the signature image (i.e., a longitudinal profile of indicia located on the web surface), the processor 100 analyzes the data to identify indicia contrast changes (i.e., light level changes) suitable for use as control marks. To perform this analysis the processor 100 identifies local valleys (minimums) and peaks (maximums) of light intensity within the sampled profile and then calculates the slope of these contrast changes by calculating the difference between adjacent maximum and minimum values and dividing by the number of position counts beteen maximum and minimum values. In addition, a mid-point value is calculated to be used to establish a trip point. The address in memory of each located contrast change corresponds to the position count accumulated by the processor and thus corresponds to the location within the signature. In the illustrated embodiment, up to 16 contrast change regions are identified and stored if they have a certain minimum required slope which is determined by a programmable constant. The slope constant can be changed, as described hereinafter to provide for various image sizes. Once the sixteen suitable contrast change regions have been found, they are reduced to a predetermined number (four in the preferred embodiment) with the largest slope since a sharp transition permits a more detectable reproducible mark. The retained four regions are then subjected to a gate analysis.

The gate analysis determines which contrast change regions are at least a predetermined minimum distance from adjacent contrast changes so as to provide a predetermined time window located around the contrast region within which only the desired contrast change can be found. During gate analysis, the number of contrast change regions may be reduced to one or in the alternative to several contrast change regions. These remaining contrast change regions are to be used as control marks for automatically maintaining registration of the web. Assuming, as in the specific embodiment illustrated, the contrast regions are reduced to one control mark, the location of the mark is stored and the mid-point trip value is output through a digital to analog (D/A) converter to a comparator for comparison to the output of the scanner. This effectively provides adjustment of the sensitivity of the scanner system to compensate for variations in scanner light levels. A time window gate is then set up to activate the comparison only during the time window of predetermined length during which the chosen mark is expected. A test cycle is subsequently run to check the control mark to determine whether it is produced at the expected location. To locate the mark, the comparator is triggered by detection of a contrast change and if it occurs during the time window, the processor 100 captures the address (position count) of the detection and compares that address to the initial address of the stored control mark. The difference is used to generate an error signal. If the difference or error signal during the test cycle is less than a predetermined constant value, which is programmable to provide for different web operating apparatus deviation characteristics, then the control mark is accepted. If the control mark does not meet requirements during the test cycle, the entire process is repeated beginning with acquisition of a new sample profile.

During the manual mode while the system is digitizing and analyzing data and during the test cycle, the mark pulse light 54 flashes on and off slowly. After the test cycle has been completed and the control mark is accepted, the mark pulse light flashes in a blip fashion which indicates to the operator that the system can be switched to automatic. Once switched to automatic, the processor 100 operates as in the test mode to detect the difference between the occurrence of the control mark and its expected initial location as well as detecting whether the control mark occurs early or late, and generates an error signal as well as an advance on retard signal based upon the difference. This difference in location between the control mark and its initial stored location is normalized such that the units produced represent a consistent length of the web (e.g., six thousandths of an inch in the preferred embodiment) regardless of the impression size of the apparatus used and this normalized value is displayed on the display 96. The error signal is applied to the correction motor drive circuitry 98 to automatically maintain the registration condition of the web by selectively advancing or retarding the web position in response to the error signal. During automatic operation no correction is made unless a minimum error of a predetermined number of counts is detected, thus creating a desired error "dead zone", which is programmable to accommodate a variety of web operating systems.

One source of variation in the control mark location, which is tested during the test cycle, can be caused by lateral movement of the web. When the control mark is the result of an edge of a contrast change region wherein the edge is not perfectly perpendicular to the direction of travel of the web (i.e., the line of the contrast change angled or curved) a lateral movement of the web will result in relative movement of the control mark position even though the web registration condition has not changed. Thus, a test cycle or several test cycles can be run to determine whether the mark shifts too much while the web is moving. During the manual mode, the test cycle can continuously monitor the deviation from the expected position of the control mark over a succession of repeat lengths and if the error exceeds a predetermined acceptable limit, the mark is discarded. This provides a means of minimizing the probability of an unacceptable mark which will vary with lateral movement of the web.

In an alternative implementation of the illustrated embodiment another technique is used to further reduce the probability of an angled or curved mark. At the point during manual mode that the processor 100 has identified several (preferably four) potential control marks with the minimum isolation required, these marks and associated time windows are retained as control marks and the system can be put into the automatic mode. During automatic mode, the remaining control marks are used for maintaining registration and the error for each mark is continuously monitored. The control marks can then be slowly discarded until only a minimum number (preferably one) remain based upon the variation in error and the relationship between of the errors of each mark. This permits a highly reliable means of discriminating out the angled or curved marks.

Another feature of the system provides for the use of a preprinted pattern on the web, such as a pattern composed of two small parallel lines with predetermined spacing between them. Thus the processor 100, after accumulating the digitized profile, would search for two marks with the predetermined spacing and then use that mark as the control mark as described hereinbefore. If the preprinted mark is not found, the processor 100 then uses the above described method for locating a suitable control mark.

During automatic operation, the processor 100 can compensate for detected error by one of two alternative methods. In the first method the correction motor speed is adjusted by the operator and the processor 100 activates the motor to make the corrections proportional to the amount of detected error. This approach can lead in some circumstances to overshoot or undershoot (i.e., hunting) due to such factors as transportation delay. In an optional approach, the processor 100 activates the correction motor 40 based upon the rate of change of the error signal (i.e., a derivative) or some combination of the derivative and other factors such as transportation delay, type of paper, etc. In this manner the processor 100 can analyze the rate of change of the error signal and other factors to set the control loop gain.

A number of input controls 97 are coupled to the processor 100 to allow the operator to preset a number of the programmable constants utilized by the processor 100. A sixteen position switch allows an image size (i.e., impression size) of the printing press to be preset to permit use of different size printing presses with the system. This results in presetting those constants which are directly determined by the impression size. Another sixteen position switch allows presetting the time window size to be compatible with the maximum registration deviation of the press. A third and fourth sixteen position switch allows presetting printing speed and presetting the "dead zone" value.

Figure 4:
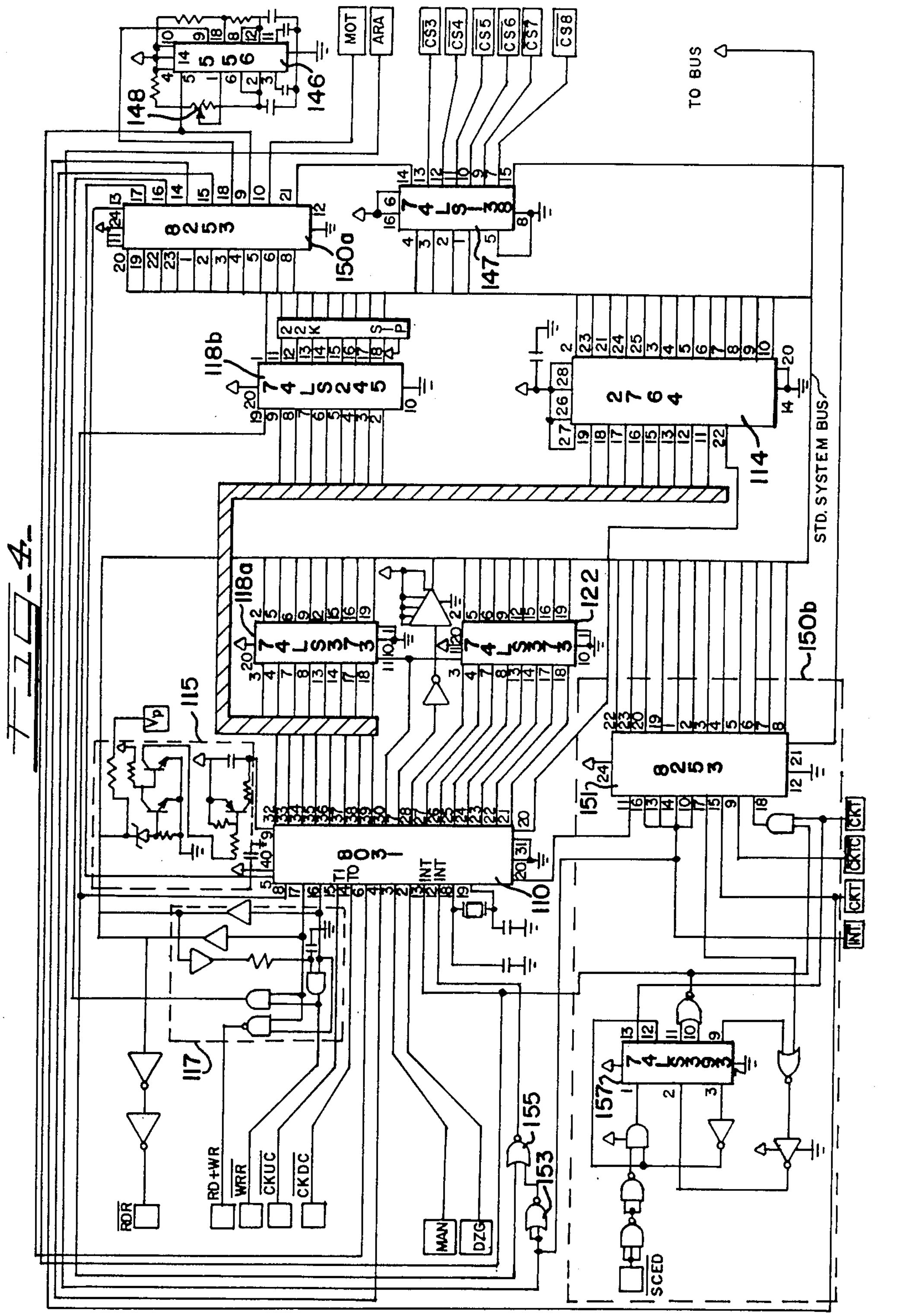
FIG. 4 is an electrical schematic diagram of specific circuitry that can be used to implement a portion of the operation of the block diagrams of FIGS. 2 and 3.
Figure 5:
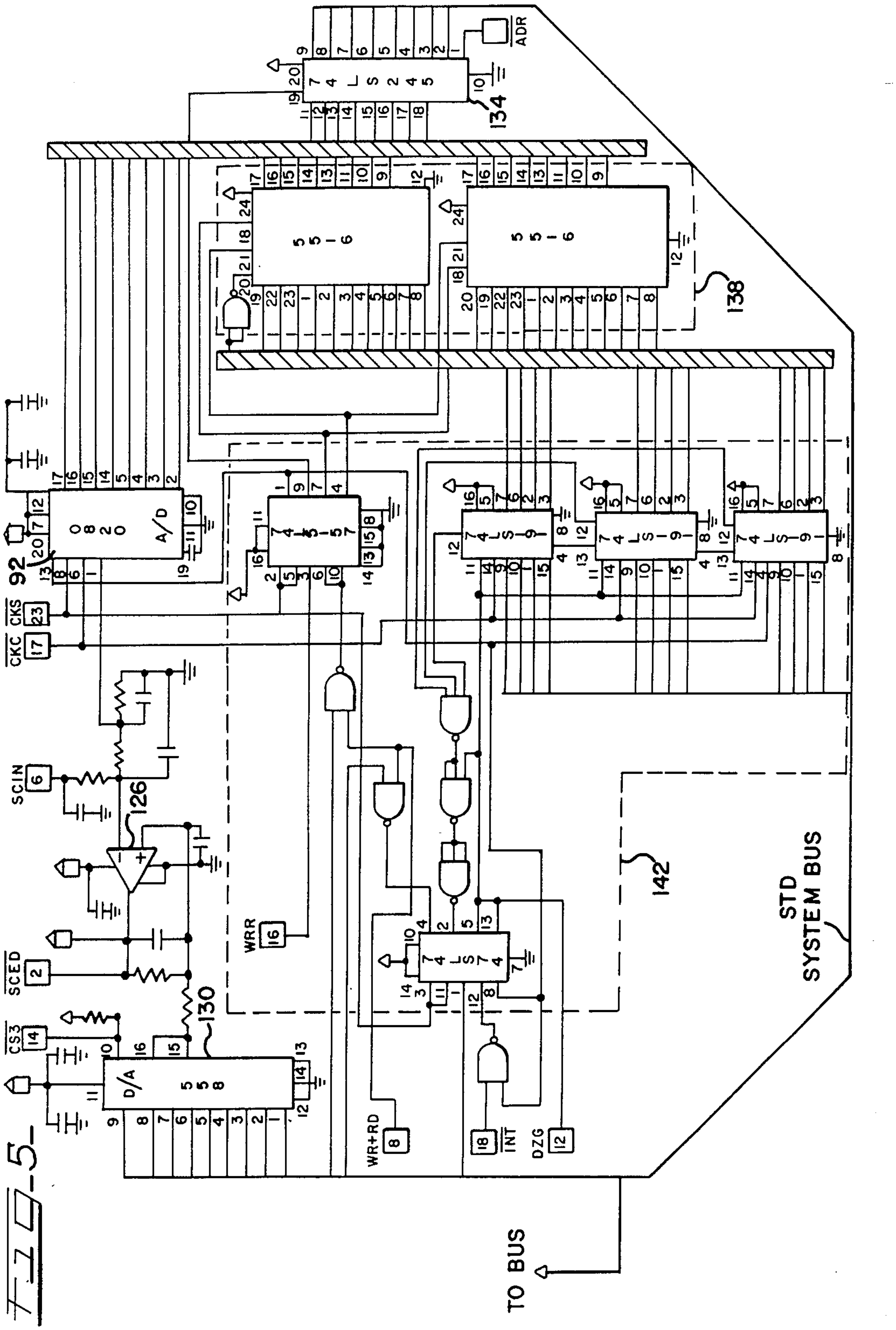
FIG. 5 is an electrical schematic diagram of specific circuitry that can be used to implement a portion of the operation of the block diagrams of FIGS. 2 and 3.
Figure 6:
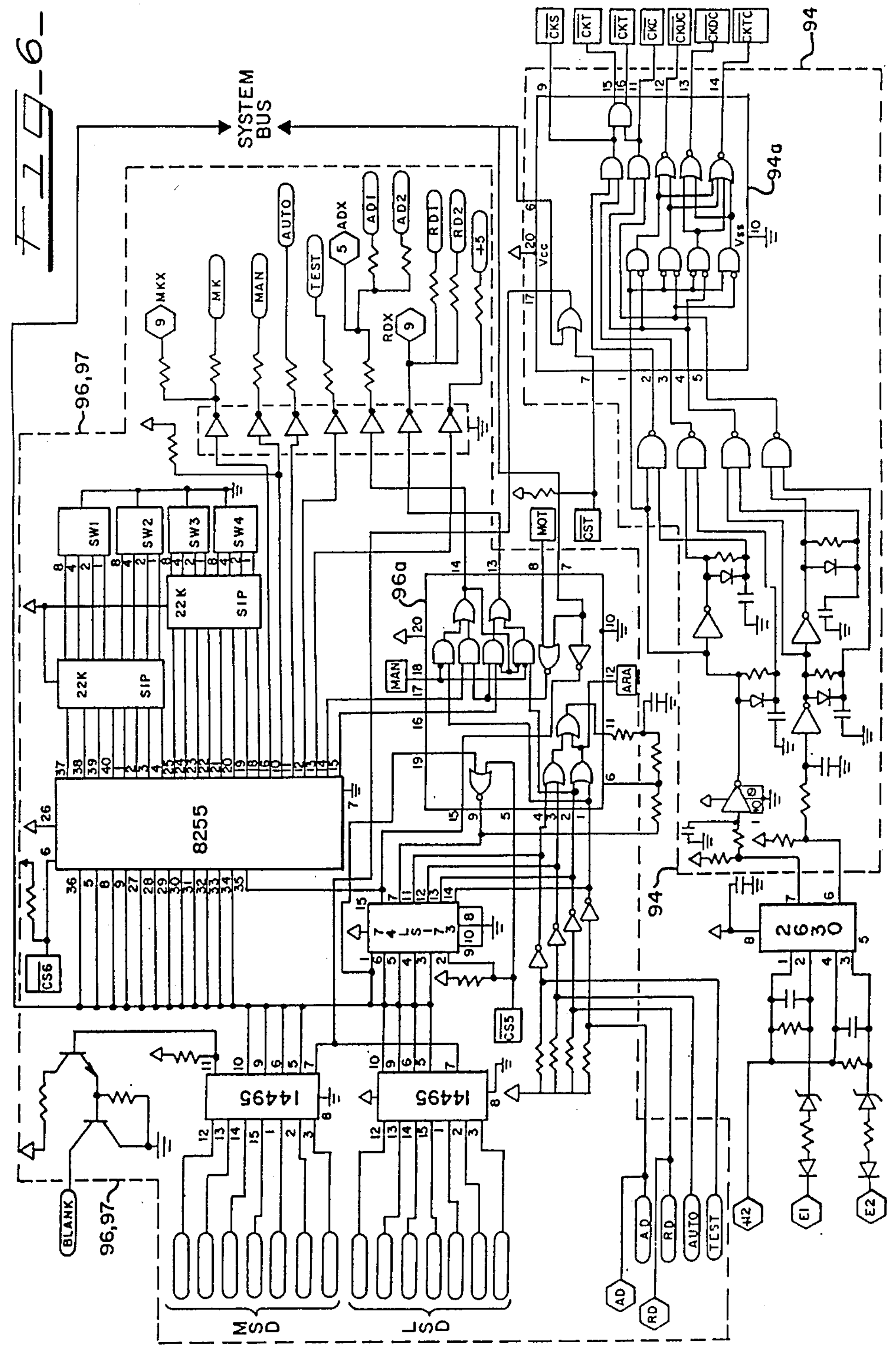
FIG. 6 is an electrical schematic diagram of specific circuitry that can be used to implement a portion of the operation of the block diagram of FIGS. 2 and 3.

Referring to FIG. 3 there is shown a detail block diagram of the system of FIG. 2. Detail schematic circuit diagrams of a specific embodiment corresponding to the block diagram of FIG. 3 are shown in FIGS. 4 through 6 with corresponding blocks shown enclosed within dash lines and labeled with corresponding reference numerals. As illustrated in FIG. 3, a microprocessor 110 coupled via a bus 111 to a program memory 114 containing program instructions for the microprocessor 110 form the central control logic of the processor 100. By reference to FIG. 4 it can be seen that this control logic is implemented using an Intel 8031 microprocessor and an Intel 2764 UV erasable, programmable read only memory (EPROM) which provides an 8K by 8 program memory. The bus 111 is coupled to the standard system bus 123 through latch/buffer circuitry 118. As shown in FIG. 4, the latch 118a is implemented using a 74LS373 latch as an address latch and the buffer 118b is implemented using a 74LS245 tri-state bus transceiver which provides isolation when the program memory 114 is being read by the microprocessor 110. In addition, the processor 110 is coupled to the system bus 123 via the address latch 122 utilizing a 74LS373 tri-state latch as shown in FIG. 4. Also shown in FIG. 4 is a chip select decoder 147 implemented using a 74LS138 decoder to generate chip select signals for selection of functions located on external circuit boards such as shown in FIGS. 5 and 6, as well as conventional power up circuitry 115 and read/write signal generating logic 117.

In FIG. 3 there is shown timer/counter and interrupt logic 150 together with a clock generating circuit 146 coupled to the system bus 123. This circuitry performs most of the counting/timing functions thereby freeing the microprocessor 110 for other tasks. The timer/counter 150 is composed as shown in FIG. 4 of an Intel 8253 programmable timer/counter 150a in conjunction with a dual 556 timer functioning as a dual clock, and as shown at 150b an Intel 8253 programmable timer/counter 151 in conjunction with a 74LS393 dual, 4 bit counter utilized to freeze the timer/counter 151. Each 8253 programmable timer/counter includes three 16 bit programmable timer/counter circuits (i.e., counter zero, one, and two) thus providing a total of six timer/counter functions. The timer/counter 151 (FIG. 4) provides a "once around" count using the counter zero, a pregate count using counter one, and a gate counter using counter two. The "once around" counter is set arbitrarily to zero at start up and is programmed to count the $\overline{CKTC}$ clock pulses to 3600 and then reset, thus providing a position count (i.e., location address) for a complete repeat length of the web, and producing a once around interrupt at reset. The $\overline{CKTC}$ and other encoder dependent clock signals are generated from the encoder signals by the multiplier clock generator 94 which is implemented as shown in FIG. 6.

The once around interrupt signal is coupled to the microprocessor 110 through the gates 153, 155 as shown, and indicates to the microprocessor 110 the end of a repeat length. The once around interrupt is also coupled to counter one of the timer/counter circuit 151, the counter two of the timer/counter circuit 150a, as shown in FIG. 4 and to the direct memory access (DMA) circuitry 142 shown in FIG. 5. The counter one of the timer/counter 151 is triggered by the once around interrupt to start a pregate count which determines the time interval from the generation of the once around interrupt to the beginning of the control mark time window. The output of the counter one tiggers the counter two of timer/counter 151 to start the gate count, which determines the control mark time window. The counts used are programmable values and in the preferred embodiment are determined by a set of switches 97 shown in FIGS. 3 and 6.

In the illustrated embodiment the control mark time window is centered when the system is switched to automatic by changing the phase of the once around counter to place the control mark near the center of the once around count. This separates in time the once around interrupt from the control mark. Once a control mark is detected by the comparator 126 (see FIGS. 3 and 5), the comparator generates a control mark interrupt (SCED) which is coupled to the microprocessor 110 via a counter 157 as shown in FIG. 4. The counter 157 also disables the timer/counter circuit 151 for a preselected number of encoder counts (i.e., four counts in the preferred embodiment) thus freezing the timer/counter 151 for a period of time sufficient to allow the counter to be read by the microprocessor 110 (i.e., determine the mark location). In response to the control mark interrupt, the microprocessor 110 subtracts the mark location from the stored initial mark address to obtain an error count. This value is normalized by the microprocessor 110 and displayed on the display 96 during the automatic mode, and is used to generate an error signal to control the correction motor 40.

The second timer/counter circuit 150a shown in FIG. 4 also comprises three timer/counters zero, one, and two which function primarily as I/O timers. The counter zero is utilized to control the correction motor (e.g., a synchronous motor) turn on time. The error count is loaded into the counter zero which then counts down with the motor on until zero is reached. The counter zero is clocked by pulses generated by one-half of the dual 556 timer 146 with the clock frequency controlled by an adjusting potentiometer 148, as shown in FIG. 4. Thus the potentiometer controls the motor speed. The counter one of the timer/counter circuit 150a functions as a watch dog timer in the automatic mode to reset the system if no mark signal is detected within a predetermined period (e.g., one and one-half repeat lengths in the preferred embodiment). The control mark interrupt resets the counter one of the timer/counter circuit 150a to a count equal to one and one-half times that for a complete repeat length (e.g., 4800) and the counter one is clocked by the multiplier clock signal CKT. If the counter one reaches zero, indicating that no control mark was detected, it resets the microprocessor 110. Finally, the counter two of timer/counter circuit 150a is used as a system interlock speed check counter so that the system is stopped if the speed of the apparatus drops below a preselected value. A clock signal of fixed frequency (one kilohertz in the preferred embodiment) is generated by the second half of the 556 timer 146 and is coupled to the counter two of the timer/counter circuit 150a which is configured as a retriggerable one shot with a preset count. The retriggerable one shot is triggered by the once around interrupt and counts down based on the fixed frequency clock. If the count reaches zero before the next once around interrupt resets the counter, indicating that the system is moving too slowly, a microprocessor interrupt is generated and coupled to the microprocessor 110, as shown in FIG. 4.

In addition to the external counters, there are two 16 bit counters (T1, T0) internal to the microprocessor 110 which are used as reverse count absorbers. The clock signals $\overline{CKUC}$ (which generates pulses only during clockwise rotation) and $\overline{CKDC}$ (which generates pulses only during counter clockwise rotation) are coupled to these clock inputs from the clock multiplier generator 94 as can be seen by inspection of FIGS. 4 and 6. The counter (T1 or T0) which is receiving pulses at the time the system is switched to automatic is assumed to be the primary direction of the system apparatus and therefore the other counter is used to count any pulses which are applied, thereby acting as a reverse count by counting reverse clock pulses. This reverse count is used to rephase the clock count in the timer/counter 151 since the timer/counter 151 continues to count when the web is traveling the reverse direction. This reverse counter (i.e., T1 or T0) is then reset allowing it to continually monitor for reverse pulses.

During both manual and automatic operation the scanner 66 serves as a transducer detecting light levels reflected from the web and converting them to representative electrical signals (SCIN) which are coupled as shown in FIGS. 3 and 5, and the A/D converter 92 and the comparator 126. A commercially available scanner (e.g., a SICK #NT8) is used with a fixed aperture and comprises a light source which illuminates the web through a one way mirror and lens. This light is reflected off the web, back through the lens, and is reflected off the one way mirror to a main photo-diode for detection. Part of the light from the light source is reflected off a second mirror to a second photo-diode to monitor the light output of the source. This signal is used internal to the scanner to compensate the main photo diode output for variations in light source output. The compensated scanner signal (SCIN) is then amplified and coupled to the A/D converter 92 and the comparator 126.

The A/D converter 92 in the illustrated embodiment is a high speed flash converter (e.g., National Semiconductor ADC0820) which samples and digitizes the scanner signal. The A/D converter 92 is clocked by two multiplier clock generator 94 signals $\overline{CKS}$ (for read triggering) and CKC (for write triggering) as shown in FIG. 5. These signals are also coupled to the direct memory access (DMA) circuitry 142, as shown in FIGS. 3 and 5. The digitized samples from the A/D converter 92 are coupled to the data memory 138 composed of random access memory and to a buffer 134. The buffer 134 provides isolation to prevent access to the data RAM 138 by the microprocessor 110 while the A/D converter 92 is loading the data RAM 138. As illustrated in FIG. 5, the data RAM 138 is implemented utilizing 5516 static 2K by 8 random access memory and the buffer 134 is implemented using a 74LS245 tri-state buffer.

The DMA circuitry 142 is also coupled as shown in FIG. 3 to the data RAM 138 and is implemented as shown in FIG. 5 utilizing 374LS191 presettable synchronous counters, a 74LS157 decoder (i.e., multiplexer) and a 74LS74 dual, D-type flipflop. The synchronous counters in FIG. 5 function as address counters for loading the memory during direct A/D converter access. This is initiated by the microprocessor 110 with the starting address loaded by the microprocessor 110 at the start of the digitizing cycle. The counters ae presettable and are therefore transparent to the microprocessor 110 when it needs to read or write the RAM directly. The decoder circuit functions as steering logic which triggers the A/D converter and the address counters during the digitizing cycle in response to the microprocessor 110 and provides for selection of direct read-write RAM access by the microprocessor 110. The 74LS74 dual synchronous flipflop circuit provides synchronization of the address counters with the once around interrupt (INT) and generates a digitizing signal (DZG) coupled to the microprocessor 110.

Referring again to FIG. 3, a digital analog (D/A) converter 130 is shown coupled to the bus 123 to convert a digital trip point value calculated by the microprocessor 110 to an analog signal which is then applied to a comparator 126, as shown. The D/A converter 130 is implemented, as illustrated in FIG. 5, using a 558 latchable digital-to-analog converter and the comparator 126 is implemented using a conventional 311 operational amplifier. Also coupled to the comparator 126 is the scanner signal (SCIN) which is compared to the trip value. If it is greater than the trip value, indicating the detection of a control mark, an interrupt (SCED) is generated and coupled to the microprocessor 110.

Also coupled to the bus 123 are the display 96, switches and related interface circuitry 97, as shown in block diagram form in FIG. 3 and illustrated in greater detail in FIG. 6. Referring to FIG. 6, the interface circuitry is implemented primarily utilizing an 8255 programmable peripheral interface circuit which provides two ports to the bus from a set of switches (SW1, SW2, SW3 SW4) which allow the programming of system constants, and a third port that serves as an output port for light signals (MX, MAN, AUTO, TEST, AD1, AD2, RD1, RD2) and for external advance and retard signals to the correction motor (ADX, RDX). A set of MC14495 BCD to seven segment decoder/drivers are used to implement the interface to a two digit error display. A set of push buttons for advance (AD), retard (RD), test and auto interface to the bus through a 74LS173 tri-state latch. These inputs are also coupled, as shown, to a fused logic gate array **96*a* which functions as steering logic to allow manual control of the motor even when the microprocessor 110 malfunctions. This logic array also generates a "switch activated" signal ARA which allows the microprocessor 110** to monitor the use of the advance and retard switches for manual intervention.

Also shown in FIG. 6 is a detailed schematic of the multiplier clock generator 94 which is implemented using a 2630 optical isolator for isolation, a set of gates, and a fused logic gate array **94*a***. This circuit generates, from the two phase encoder signals (E1, and E2) a set of clock signals for various control and counting functions, as shown.

A specific embodiment of a novel method and apparatus for controlling web handling machinery has been described for the purposes of illustrating the manner in which the invention may be used and made. It should be understood that the implementation of other variations and modifications of the invention in its various aspects will be apparent to those skilled in the art and that the invention is not limited thereto by the specific embodiments described. It is therefore contemplated to cover by the present invention any and all modifications, variations or equivalents that fall with the true spirit and scope of the basic underlying principles disclosed and claimed herein.

```
ISIS-II MCS-51 RELOCATOR AND LINKER, V2.0, INVOKED BY:
 RL51 :F1:MKOV02.OBJ,:F1:MKAV01.OBJ,:F1:DIV.OBJ TO :F1:MRTKV2.OBJ


INPUT MODULES INCLUDED
   :F1:MKOV02.OBJ(MKOV02)
   :F1:MKAV01.OBJ(MKAV01)
   :F1:DIV.OBJ(DIV)


LINK MAP FOR :F1:MRTKV2.OBJ(MKOV02)
```

| TYPE | BASE | LENGTH | RELOCATION | SEGMENT NAME |
|---|---|---|---|---|
| REG | 0000H | 0008H | | "REG BANK 0" |
| CODE | 0000H | 0AF6H | ABSOLUTE | |
| | 0AF6H | 010AH | | *** GAP *** |
| CODE | 0C00H | 0215H | ABSOLUTE | |
| | 0E15H | 00EBH | | *** GAP *** |
| CODE | 0F00H | 0039H | ABSOLUTE | |

SYMBOL TABLE FOR :F1:MRTKV2.OBJ(MKOV02)

| VALUE | TYPE | NAME |
|---|---|---|
| ------- | MODULE | DIV |
| D:0027H | PUBLIC | BFLAGS |
| C:0F2DH | SYMBOL | CNT |
| C:0F38H | SYMBOL | CNT1 |
| B:0027H | SYMBOL | D2VR |
| C:0F10H | SYMBOL | DIVD1 |
| C:0F18H | SYMBOL | DIVD2 |
| C:0F1AH | SYMBOL | DIVD3 |
| C:0F00H | PUBLIC | DIVI |
| ------- | ENDMOD | DIV |

```
ISIS-II MCS-51 MACRO ASSEMBL
OBJECT MODULE PLACED IN :F1:
ASSEMBLER INVOKED BY:  ASM51
```

| LOC | OBJ | | LINE |
|---|---|---|---|
| | | | 1 |
| | | | 2 |
| | | | 3 |
| | | | 4 |
| | | | 5 |
| | | | 6 |
| | | | 7 |
| | | | 8 |
| | | | 9 |
| | | | 10 |
| | | | 11 |
| | | | 12 |
| | | | 13 |
| 0027 | | | 14 |
| | | | 15 |
| 0038 | | | 16 |
| | | | 17 |
| | | | 18 |
| | | | 19 |
| 0F00 | | | 20 |
| | | | 21 |
| 0F00 | 7900 | F | 22 |
| 0F02 | 7C08 | | 23 |
| | | | 24 |
| 0F04 | E500 | F | 25 |
| 0F06 | F500 | F | 26 |
| | | | 27 |
| 0F08 | E500 | F | 28 |
| 0F0A | F500 | F | 29 |
| | | | 30 |
| 0F0C | E7 | | 31 |
| 0F0D | B45008 | | 32 |
| | | | 33 |
| 0F10 | C3 | | 34 |
| 0F11 | 13 | | 35 |
| 0F12 | F500 | F | 36 |

| LOC | OBJ | | LINE |
|---|---|---|---|
| 0F14 | D238 | | 37 |
| 0F16 | 8002 | | 38 |
| | | | 39 |
| 0F18 | 50F6 | | 40 |
| | | | 41 |
| 0F1A | C3 | | 42 |
| 0F1B | 7800 | F | 43 |
| | | | 44 |
| 0F1D | E6 | | 45 |
| 0F1E | 33 | | 46 |
| | | | 47 |
| 0F1F | F6 | | 48 |
| | | | 49 |
| 0F20 | 18 | | 50 |
| | | | 51 |
| 0F21 | E6 | | 52 |
| 0F22 | 33 | | 53 |
| 0F23 | F6 | | 54 |
| | | | 55 |
| 0F24 | C3 | | 56 |
| | | | 57 |
| 0F25 | 97 | | 58 |
| 0F26 | 4005 | | 59 |
| | | | 60 |
| 0F28 | 7800 | F | 61 |
| 0F2A | F6 | | 62 |
| | | | 63 |
| 0F2B | 08 | | 64 |
| 0F2C | 06 | | 65 |
| | | | 66 |
| 0F2D | DCEB | | 67 |
| 0F2F | 303806 | | 68 |
| 0F32 | E500 | F | 69 |
| 0F34 | C3 | | 70 |
| 0F35 | 13 | | 71 |
| 0F36 | F500 | F | 72 |
| | | | 73 |
| 0F38 | 22 | | 74 |
| | | | 75 |

MCS-51 MACRO ASSEMBL. DIV

SYMBOL TABLE LISTING

| N A M E | T Y P E | V A L U E | | A T T R I B U T E S |
|---|---|---|---|---|
| BFLAGS . . | D ADDR | 0027H | A | PUB |
| CNT. . . . | C ADDR | 0F2DH | A | |
| CNT1 . . . | C ADDR | 0F38H | A | |
| D2VR . . . | B ADDR | 0027H.0 | A | |
| DIV1H. . . | D ADDR | ----- | | EXT |
| DIV1L. . . | D ADDR | ----- | | EXT |
| DIVD1. . . | C ADDR | 0F10H | A | |
| DIVD2. . . | C ADDR | 0F18H | A | |
| DIVD3. . . | C ADDR | 0F1AH | A | |
| DIVI . . . | C ADDR | 0F00H | A | PUB |
| DIVIDH . . | D ADDR | ----- | | EXT |
| DIVIDL . . | D ADDR | ----- | | EXT |
| DIVIS. . . | D ADDR | ----- | | EXT |

REGISTER BANK(S) USED: 0

ASSEMBLY COMPLETE, NO ERRORS FOUND

| LOC | OBJ | LINE |
|---|---|---|
| 0C44 | F554 | 106 |
| | | 107 |
| 0C46 | E553 | 108 |
| 0C48 | 354B | 109 |
| 0C4A | F555 | 110 |
| | | 111 |
| 0C4C | C3 | 112 |
| | | 113 |
| 0C4D | 740F | 114 |
| 0C4F | 9554 | 115 |
| 0C51 | F54E | 116 |
| | | 117 |
| 0C53 | 741E | 118 |
| 0C55 | 9555 | 119 |
| 0C57 | F54F | 120 |
| | | 121 |
| 0C59 | 4036 | 122 |
| | | 123 |
| 0C5B | 855282 | 124 |
| 0C5E | 855383 | 125 |
| | | 126 |
| 0C61 | A3 | 127 |
| | | 128 |
| 0C62 | E582 | 129 |
| 0C64 | B55407 | 130 |
| 0C67 | E583 | 131 |
| 0C69 | B55502 | 132 |
| 0C6C | 8067 | 133 |
| | | 134 |
| 0C6E | E0 | 135 |
| 0C6F | B55103 | 136 |
| 0C72 | 8005 | 137 |
| | | 138 |
| 0C74 | 22 | 139 |
| | | 140 |
| 0C75 | 5002 | 141 |
| 0C77 | 80E8 | 142 |
| | | 143 |
| 0C79 | 20150E | 144 |
| | | 145 |
| 0C7C | D215 | 146 |
| 0C7E | C211 | 147 |
| 0C80 | C210 | 148 |
| 0C82 | C20B | 149 |
| | | 150 |
| 0C84 | E557 | 151 |
| 0C86 | F550 | 152 |

```
LOC  OBJ                LINE
                         153
0C88 8084                154
                         155
0C8A DFF2                156
                         157
0C8C C211                158
0C8E 020CD5              159
                         160
0C91 C3                  161
                         162
0C92 E554                163
0C94 940F                164
0C96 F54E                165
                         166
0C98 E555                167
0C9A 940E                168
0C9C F54F                169
                         170
0C9E 855282              171
0CA1 855383              172
                         173
0CA4 A3                  174
                         175
0CA5 E582                176
0CA7 B41007              177
0CAA E583                178
0CAC B41E02              179
0CAF 800A                180
                         181
0CB1 E0                  182
0CB2 B55102              183
0CB5 80C2                184
                         185
0CB7 50C0                186
0CB9 80E9                187
                         188
0CBB 900FFF              189
                         190
0CBE A3                  191
                         192
0CBF E582                193
0CC1 B54C07              194
0CC4 E583                195
0CC6 B54F02              196
0CC9 800A                197
                         198
0CCB E0                  199
0CCC B55102              200
0CCF 80A8                201
                         202
0CD1 50A6                203
0CD3 80E9                204
                         205
0CD5 22                  206
                         207
0CD6 020D17              208
                         209
                         210
                         211
                         212
                         213
                         214
                         215

ISIS-II MCS-51 MACRO ASSEMBL
OBJECT MODULE PLACED IN :F0:
ASSEMBLER INVOKED BY:  ASM51

LOC  OBJ                LINE

                           1
                           2
                           3
                           4
                           5
                           6
                           7
                           8
                           9
                          10
                          11
                          12
                          13
                          14
                          15
                          16
                          17
                          18
                          19
                          20
                          21
                          22
     000F                 23
     001E                 24
                          25
                          26
     004A                 27
     004B                 28
     004C                 29
     004D                 30
     004E                 31
     004F                 32
     0050                 33
     0051                 34
     0052                 35
     0053                 36
     0054                 37
     0055                 38
     0056                 39
     0057                 40
                          41
                          42
                          43
     0021                 44
     0022                 45
                          46
                          47
     0008                 48
     0009                 49
     000A                 50
     000B                 51
     000C                 52
     000D                 53
     000E                 54
     000F                 55
                          56
     0010                 57
     0011                 58
     0012                 59
     0013                 60
     0014                 61
     0015                 62
     0016                 63
                          64
                          65
                          66
0C00                      67
                          68
0C00 755200               69
0C03 755300               70
0C06 752100               71
0C09 752200               72
0C0C 7F0F                 73
                          74
0C0E 780F                 75
0C10 791E                 76
0C12 754A00               77
0C15 754B00               78
```

```
LOC   OBJ             LINE
0C18  754C00            79
                        80
0C1B  120CD9            81
                        82
0C1E  C208              83
0C20  200908            84
0C23  200B08            85
0C26  120CDF            86
0C29  80F3              87
                        88
0C2B  020CD6            89
                        90
0C2E  301143            91
0C31  E54C              92
0C33  F551              93
                        94
0C35  C3                95
0C36  E500       F      96
0C38  13                97
0C39  F54B              98
                        99
0C3B  E500       F     100
0C3D  13               101
0C3E  F54A             102
                       103
0C40  E552             104
0C42  254A             105
```

```
LOC   OBJ             LINE
0CD9  8882             216
0CDB  8783             217
                       218
0CDD  E0               219
0CDE  FA               220
                       221
0CDF  C3               222
                       223
0CE0  E8               224
0CE1  9401             225
0CE3  F582             226
0CE5  F8               227
                       228
0CE6  E9               229
0CE7  9400             230
0CE9  F583             231
0CEB  F9               232
                       233
0CEC  940F             234
0CEE  6017             235
                       236
0CF0  E0               237
0CF1  F5F0             238
0CF3  C3               239
0CF4  9A               240
0CF5  AAF0             241
                       242
0CF7  B50003     F     243
0CFA  D208             244
                       245
0CFC  22               246
                       247
0CFD  20E70A           248
0D00  5002             249
                       250
0D02  80F6             251
                       252
0D04  D209             253
0D06  22               254
                       255
0D07  D20B             256
0D09  22               257
                       258
```

```
0D0A  3013D2           259
                       260
0D0D  754B02           261
0D10  D216             262
                       263
0D12  80E6             264
                       265
0D14  020C2E           266
                       267
                       268
                       269
                       270
                       271
                       272
                       273
0D17  754A00           274
0D1A  D213             275
                       276
                       277
                       278
0D1C  E9               279
0D1D  FC               280
0D1E  E8               281
0D1F  FB               282
0D20  EA               283
0D21  FD               284
                       285
0D22  754B00           286
0D25  200D56           287
0D28  054A             288
                       289
0D2A  C209             290
                       291
0D2C  91DE             292
                       293
0D2E  2009F4           294
0D31  200303           295
0D34  200BDD           296
                       297
                       298
                       299
0D37  D20D             300
0D39  054B             301
0D3B  E54D             302
                       303
0D3D  B40303           304
                       305
0D40  020D45           306
                       307
0D43  40E5             308
                       309
0D45  E54A             310
0D47  B50002     F     311
0D4A  8002             312
                       313
0D4C  405E             314
                       315
0D4E  10160B           316
                       317
0D51  C3               318
0D52  E8               319
0D53  254D             320
0D55  F8               321
                       322
0D56  E9               323
0D57  3400             324
0D59  F9               325
                       326
0D5A  8009             327
                       328
0D5C  C3               329
0D5D  E8               330
0D5E  2401             331
0D60  F8               332
                       333
```

| LOC | OBJ | |
|---|---|---|
| 0D61 | E9 | |
| 0D62 | 3400 | |
| 0D64 | F9 | |
| 0D65 | 894F | |
| 0D67 | 884E | |
| 0D69 | 8882 | |
| 0D6B | 8783 | |
| 0D6D | E0 | |
| 0D6E | C3 | |
| 0D6F | 9D | |
| 0D70 | FE | |
| 0D71 | 13 | |
| 0D72 | C3 | |
| 0D73 | 2D | |
| 0D74 | FA | |
| 0D75 | E0 | |
| 0D76 | 9A | |
| 0D77 | 6008 | |
| 0D79 | 4006 | |
| 0D7B | A3 | |
| 0D7C | 80F7 | |
| 0D7E | 020DAC | |
| 0D81 | 301508 | |
| 0D84 | EE | |
| 0D85 | B55002 | |
| 0D88 | 801E | |
| 0D8A | 501C | |
| 0D8C | E0 | |
| 0D8D | 201025 | |
| 0D90 | D211 | |
| 0D92 | D210 | |
| 0D94 | F54C | |
| 0D96 | 8E57 | |
| 0D98 | 858252 | |
| 0D9B | 858353 | |
| 0D9E | C3 | |
| 0D9F | 854E82 | |
| 0DA2 | 854F83 | |
| 0DA5 | E0 | |
| 0DA6 | F556 | |
| 0DA8 | A84E | |
| 0DAA | A94F | |
| 0DAC | C213 | |
| 0DAE | C20D | |
| 0DB0 | C209 | |
| 0DB2 | 020C1E | |
| 0DB5 | F54D | |
| 0DB7 | EE | |
| 0DB8 | B55702 | |
| 0DBB | 80EB | |
| 0DBD | 40C9 | |
| 0DBF | C3 | |
| 0DC0 | E552 | |
| 0DC2 | 9582 | |
| 0DC4 | F554 | |
| 0DC6 | E553 | |
| 0DC8 | 9583 | |
| 0DCA | F555 | |
| 0DCC | C3 | |
| 0DCD | E554 | |
| 0DCF | 33 | |
| 0DD0 | F554 | |
| 0DD2 | E555 | |
| 0DD4 | 33 | |
| 0DD5 | B50007 | F |
| 0DD8 | F554 | |
| 0DDA | B50002 | F |
| 0DDD | 80C9 | |
| 0DDF | 4004 | |
| 0DE1 | E54D | |
| 0DE3 | 80AF | |
| 0DE5 | C3 | |
| 0DE6 | 854E82 | |
| 0DE9 | 854F83 | |
| 0DEC | E0 | |
| 0DED | 9556 | |
| 0DEF | 40EC | |
| 0DF1 | B42003 | |
| 0DF4 | 020DFC | |
| 0DF7 | 40AF | |
| 0DF9 | 020E0D | |
| 0DFC | E556 | |
| 0DFE | 2410 | |

| LOC | OBJ | LINE |
|---|---|---|
| | | 484 |
| 0E00 | F54C | 485 |
| | | 486 |
| 0E02 | E0 | 487 |
| | | 488 |
| 0E03 | B54C02 | 489 |
| 0E06 | 808E | 490 |
| | | 491 |
| 0E08 | 408C | 492 |
| | | 493 |
| 0E0A | A3 | 494 |
| 0E0B | 80F5 | 495 |
| | | 496 |
| 0E0D | C3 | 497 |
| 0E0E | 13 | 498 |
| 0E0F | 2556 | 499 |
| | | 500 |
| 0E11 | F54C | 501 |
| 0E13 | 80ED | 502 |
| | | 503 |
| | | 504 |

MCS-51 MACRO ASSEMBLE..    MKAV01

SYMBOL TABLE LISTING

| NAME | TYPE | | VALUE | | ATTRIBUTES |
|---|---|---|---|---|---|
| ABSV . . . | D | ADDR | 0057H | A | |
| ACC. . . . | D | ADDR | 00E0H | A | |
| ALG. . . . | C | ADDR | 0C00H | A | PUB |
| ALG1 . . . | C | ADDR | 0C0EH | A | |
| ALG2 . . . | C | ADDR | 0C1EH | A | |
| ALG21. . . | C | ADDR | 0C2BH | A | |
| ALG3 . . . | C | ADDR | 0C2EH | A | |
| ALG4 . . . | C | ADDR | 0C40H | A | |
| ALG5 . . . | C | ADDR | 0C61H | A | |
| ALG5A. . . | C | ADDR | 0C6EH | A | |
| ALG5A1 . . | C | ADDR | 0C74H | A | |
| ALG5B. . . | C | ADDR | 0C75H | A | |
| ALG5D. . . | C | ADDR | 0C79H | A | |
| ALG5E. . . | C | ADDR | 0C7EH | A | |
| ALG5F. . . | C | ADDR | 0C8AH | A | |
| ALG6 . . . | C | ADDR | 0C91H | A | |
| ALG6A. . . | C | ADDR | 0CA4H | A | |
| ALG6B. . . | C | ADDR | 0CB1H | A | |
| ALG6C. . . | C | ADDR | 0CB7H | A | |
| ALG6D. . . | C | ADDR | 0CBBH | A | |
| ALG6E. . . | C | ADDR | 0CBEH | A | |
| ALG6F. . . | C | ADDR | 0CCBH | A | |
| ALG6G. . . | C | ADDR | 0CD1H | A | |
| ALG7 . . . | C | ADDR | 0CD5H | A | |
| ALG8 . . . | C | ADDR | 0CD6H | A | |
| ALGFL. . . | D | ADDR | 0021H | A | PUB |
| B. . . . | D | ADDR | 00F0H | A | |
| CMARK. . . | D | ADDR | 0051H | A | |
| CVALU. . . | D | ADDR | ----- | | EXT |
| DBMARH . . | D | ADDR | 0055H | A | |
| DBMARL . . | D | ADDR | 0054H | A | |
| DPH. . . . | D | ADDR | 0083H | A | |
| DPL. . . . | D | ADDR | 0082H | A | |
| EKNR . . . | B | ADDR | 0021H.4 | A | |
| ERROR. . . | B | ADDR | 0021H.6 | A | |
| ESLR . . . | B | ADDR | 0021H.5 | A | |
| GATECH . . | D | ADDR | ----- | | EXT |
| GATECL . . | D | ADDR | ----- | | EXT |
| HGATEH . . | D | ADDR | ----- | | EXT |
| HGATEL . . | D | ADDR | ----- | | EXT |
| KNC. . . . | D | ADDR | 004AH | A | |
| KNEE . . . | B | ADDR | 0021H.1 | A | |
| KNEF . . . | B | ADDR | 0022H.2 | A | |
| MADDH. . . | D | ADDR | 0053H | A | PUB |
| MADDL. . . | D | ADDR | 0052H | A | PUB |
| MARKE. . . | B | ADDR | 0022H.1 | A | |
| NEGB . . . | B | ADDR | 0022H.3 | A | |
| NPLAT. . . | B | ADDR | 0022H.6 | A | |
| NPREV. . . | B | ADDR | 0022H.0 | A | |
| NTRIG. . . | D | ADDR | 004DH | A | PUB |
| NUPKNH . . | D | ADDR | 004FH | A | |
| NUPKNL . . | D | ADDR | 004EH | A | |
| PABSV. . . | D | ADDR | 0050H | A | |
| PLAC . . . | D | ADDR | 004BH | A | |
| PLAT . . . | B | ADDR | 0021H.0 | A | |
| PPEAK. . . | D | ADDR | 0056H | A | |
| PSCAN. . . | C | ADDR | 0CD9H | A | |
| PSCAN2 . . | C | ADDR | 0CFAH | A | |
| PSCAN3 . . | C | ADDR | 0CFDH | A | |
| PSCAN4 . . | C | ADDR | 0D04H | A | |
| PSCAN5 . . | C | ADDR | 0D07H | A | |
| PSCAN6 . . | C | ADDR | 0D0AH | A | |
| PSCAN7 . . | C | ADDR | 0D14H | A | |
| PSCANA . . | C | ADDR | 0CDFH | A | |
| PSCANB . . | C | ADDR | 0CF7H | A | |
| SADDH. . . | | NUMB | 001EH | A | |
| SADDL. . . | | NUMB | 000FH | A | |

```
SALGFL . . D ADDR  0022H    A PUB
SCANF. . . B ADDR  0021H.3  A
SKNR . . . C ADDR  0D17H    A
SKNR1. . . C ADDR  0D22H    A
SKNR10 . . C ADDR  0DB5H    A
SKNR11 . . C ADDR  0DDDH    A
SKNR12 . . C ADDR  0DDDH    A
SKNR13 . . C ADDR  0DDFH    A
SKNR14 . . C ADDR  0DE5H    A
SKNR17 . . C ADDR  0DF7H    A
SKNR18 . . C ADDR  0DFCH    A
SKNR1A . . C ADDR  0D2AH    A
SKNR1B . . C ADDR  0D25H    A
SKNR2. . . C ADDR  0D37H    A
SKNR20 . . C ADDR  0E02H    A
SKNR21 . . C ADDR  0E08H    A
SKNR22 . . C ADDR  0E0DH    A
SKNR3. . . C ADDR  0D43H    A
SKNR4. . . C ADDR  0D45H    A
SKNR4A . . C ADDR  0D6DH    A
SKNR4B . . C ADDR  0D75H    A
SKNR4D . . C ADDR  0D7BH    A
SKNR4E . . C ADDR  0D4CH    A
SKNR4F . . C ADDR  0D4EH    A
SKNR4G . . C ADDR  0D5CH    A
SKNR4H . . C ADDR  0D65H    A
SKNR4I . . C ADDR  0D7EH    A
SKNR5. . . C ADDR  0D81H    A
SKNR5A . . C ADDR  0D8AH    A
SKNR5B . . C ADDR  0D8CH    A
SKNR6. . . C ADDR  0D94H    A
SKNR6A . . C ADDR  0D96H    A
SKNR7. . . C ADDR  0D98H    A
SKNR8. . . C ADDR  0DA8H    A
SKNR8A . . C ADDR  0DACH    A
SKNR9. . . C ADDR  0DB2H    A
SLOPE. . . B ADDR  0021H.2  A
SPASS. . . B ADDR  0022H.5  A
SSCAN. . . B ADDR  0021H.7  A
SVALU. . . D ADDR  ----       EXT
TRIG . . . D ADDR  004CH    A PUB
WRAP . . . B ADDR  0022H.4  A

REGISTER BANK(S) USED: 0

ASSEMBLY COMPLETE, NO ERRORS FOUND
MCS-51 MACRO ASSEMBLE          MK

ISIS-II MCS-51 MACRO ASSEMBL
NO OBJECT MODULE REQUESTED
ASSEMBLER INVOKED BY:   ASM51

LOC   OBJ            LINE

                        1
                        2
                        3
                        4
                        5
                        6
                        7
                        8
                        9
                       10
                       11
                       12
                       13
                       14
                       15
                       16
                       17
                       18
                       19
                       20
                       21
                       22
                       23
                       24
                       25
                       26
                       27
                       28
 0003                  29
 0013                  30
 0030                  31
 0040                  32
 0053                  33
 0050                  34
 0051                  35
 0052                  36
 3E10                  37
 00B6                  38
                       39
                       40
                       41
                       42
                       43
                       44
                       45
                       46
                       47
                       48
 0030                  49
 0031                  50
 0032                  51
 0033                  52
 0034                  53
 0035                  54
 0036                  55
 0037                  56
 0038                  57
 0039                  58
 003A                  59
 003B                  60
 003C                  61
 003D                  62
 003E                  63
 003F                  64
 0040                  65
 0041                  66
 0042                  67
 0043                  68
 0044                  69
 0045                  70
 0046                  71
 0047                  72
 0048                  73
 0049                  74
 0058                  75
 0059                  76

LOC   OBJ            LINE

 005A                  77
 005B                  78
 005C                  79
 005D                  80
 005E                  81
 005F                  82
 0060                  83
 0061                  84
 0062                  85
 0063                  86
 0064                  87
 0065                  88
 0066                  89
 0067                  90
                       91
                       92
                       93
                       94
                       95
 0020                  96
                       97
 0000                  98
 0001                  99
 0002                 100
 0003                 101
 0004                 102
 0005                 103
```

```
0006                104
0007                105
                    106
0023                107
                    108
0018                109
0019                110
001A                111
001B                112
001C                113
001D                114
001E                115
001F                116
                    117
0024                118
                    119
0020                120
0021                121
0022                122
0023                123
0024                124
0025                125
0026                126
0027                127
                    128
0025                129
                    130
0028                131
0029                132
002A                133
002B                134
002C                135
002D                136
002E                137
002F                138
                    139
0026                140
                    141
0030                142
0031                143
0032                144
0033                145
0034                146
0035                147
0036                148
0037                149
                    150
                    151
                    152
                    153
                    154
                    155
                    156
0091                157

MCS-51 MACRO ASSEMBLE.        MK

LOC  OBJ            LINE

 0093               158
 0094               159
 0097               160
                    161
                    162
                    163
                    164
                    165
                    166
                    167
 0090               168
 0092               169
 0096               170
                    171
                    172
                    173
                    174
0000                175
```

```
0000 803E           176
                    177
                    178
0003                179
                    180
0003 0208E6         181
                    182
                    183
000B                184
                    185
000B 020988         186
                    187
                    188
0013                189
                    190
0013 02098A         191
                    192
                    193
001B                194
                    195
001B 020AA4         196
                    197
                    198
0040                199
                    200
                    201
                    202
                    203
                    204
                    205
                    206
0040 C2AF           207
0042 C2B8           208
0044 C288           209
0046 C2A8           210
0048 C2DA           211
004A C28A           212
004C C2AA           213
                    214
004E 75816A         215
                    216
0051 120344         217
                    218
0054 E4             219
                    220
                    221
                    222
0055 7820           223
0057 F6             224
0058 00             225
0059 F6             226
005A 08             227
005B F6             228
005C 08             229
005D F6             230
005E 08             231
005F F6             232
0060 08             233
0061 F6             234
0062 08             235
0063 F6             236
                    237
0064 753B0E         238

LOC  OBJ            LINE

0067 753C10         239
                    240
006A 75A000         241
006D 7590BB         242
                    243
0070 7830           244
0072 74FF           245
0074 F2             246
                    247
0075 7853           248
0077 7492           249
0079 F2             250
```

```
007A 7484
007C 7852
007E F2
007F 7813
0081 7472
0083 F2
0084 7811
0086 7420
0088 F2
0089 7430
008B F2
008C 7930
008E 7850
0090 900AA6
0093 E2
0094 540F
0096 93
0097 F7
0098 09
0099 900AB6
009C E2
009D 54F0
009F C4
00A0 93
00A1 F7
00A2 08
00A3 09
00A4 900AC6
00A7 E2
00A8 540E
00AA 93
00AB F7
00AC 09
00AD 900AD6
00B0 E2
00B1 54F0
00B3 C4
LOC  OBJ        LINE
00B4 12034D
00B7 93
00B8 F7
00B9 09
00BA E2
00BB 54F0
00BD C4
00BE 120357
00C1 93
00C2 F7
00C3 7931
00C5 E7
00C6 B42C0E
00C9 E530
00CB B40605
00CE 753006
00D1 804E
00D3 404C
00D5 80F7
00D7 B4380E
00DA E530
00DC B40805
00DF 753008
00E2 803D
00E4 403B
00E6 80F7
00E8 B45B0E
00EB E530
00ED B40C05
00F0 75300C
00F3 802C
00F5 402A
00F7 80F7
00F9 40F0
00FB B4600E
00FE E530
0100 B41005
0103 753010
0106 8012
0108 4017
010A 80F7
010C 40F0
010E B4900E
0111 E530
0113 B41405
```

```
0116 753014        401
0119 0006          402
                   403
011B 4004          404
011D 80F7          405
                   406
011F 40F0          407
                   408
                   409
                   410
                   411
                   412
                   413
                   414
0121 E531          415
0123 D45F09        416
                   417
0126 753A05        418
0129 753902        419
012C 020137        420
                   421
012F 40F5          422
0131 753A03        423
0134 753904        424
                   425
                   426
                   427
                   428
                   429
                   430
                   431
                   432
                   433
0137 E531          434
0139 C3            435
                   436
013A 13            437
                   438
013B F546          439
                   440
013D 754401        441
0140 7545C7        442
                   443
0143 120000    F   444
                   445
0146 E548          446
0148 2401          447
                   448
014A F567          449
                   450
                   451
                   452
014C 75441C        453
014F 754520        454
                   455
0152 7831          456
0154 E6            457
0155 F546          458
                   459
0157 120000    F   460
                   461
015A E548          462
015C 8530F0        463
                   464
015F A4            465
                   466
0160 F535          467
0162 85F036        468
                   469
                   470
                   471
                   472
                   473
0165 C3            474
0166 C5F0          475
                   476
0168 13            477
                   478
0169 F558          479
                   480
016B C5F0          481
LOC  OBJ          LINE
                   482
016D 13            483
                   484
016E F559          485
                   486
                   487
                   488
0170 C3            489
0171 2535          490
0173 F560          491
                   492
0175 E558          493
0177 3536          494
0179 F561          495
                   496
                   497
                   498
017B C3            499
017C E560          500
017E 2535          501
0180 F562          502
                   503
0182 E561          504
0184 3536          505
0186 F563          506
                   507
0188 C3            508
0189 7420          509
018B 9562          510
018D F562          511
                   512
018F 741C          513
0191 9563          514
0193 F563          515
                   516
                   517
                   518
0195 120895        519
                   520
0198 1208D8        521
                   522
                   523
                   524
                   525
019B D229          526
019D D2B8          527
019F D288          528
01A1 D2A8          529
01A3 D2AF          530
                   531
01A5 200008        532
01A8 7852          533
01AA E2            534
01AB C2E2          535
01AD F2            536
                   537
01AE 80F5          538
                   539
                   540
                   541
01B0 7852          542
01B2 E2            543
01B3 D2E2          544
01B5 F2            545
                   546
01B6 758955        547
                   548
                   549
                   550
01B9 C28C          551
01BB 758CFF        552
01BE 758AF0        553
```

| LOC | OBJ | | LINE |
|---|---|---|---|
| | | | 554 |
| | | | 555 |
| | | | 556 |
| 01C1 | C28E | | 557 |
| 01C3 | 758DFF | | 558 |
| 01C6 | 758BF0 | | 559 |
| | | | 560 |
| 01C9 | D28C | | 561 |
| 01CB | D28E | | 562 |
| LOC | OBJ | | LINE |
| | | | 563 |
| 01CD | 208D05 | | 564 |
| 01D0 | 208F0D | | 565 |
| 01D3 | 80F8 | | 566 |
| | | | 567 |
| 01D5 | 120344 | | 568 |
| 01D8 | C219 | | 569 |
| | | | 570 |
| 01DA | 7843 | | 571 |
| 01DC | E4 | | 572 |
| 01DD | F6 | | 573 |
| | | | 574 |
| 01DE | 8009 | | 575 |
| | | | 576 |
| 01E0 | 120344 | | 577 |
| | | | 578 |
| 01E3 | D219 | | 579 |
| 01E5 | 7843 | | 580 |
| 01E7 | 7601 | | 581 |
| | | | 582 |
| | | | 583 |
| | | | 584 |
| 01E9 | 7852 | | 585 |
| 01EB | E2 | | 586 |
| 01EC | D2E2 | | 587 |
| 01EE | F2 | | 588 |
| | | | 589 |
| 01EF | C236 | | 590 |
| | | | 591 |
| 01F1 | 903E10 | | 592 |
| 01F4 | F0 | | 593 |
| | | | 594 |
| 01F5 | 309108 | | 595 |
| 01F8 | 209702 | | 596 |
| 01FB | 80F8 | | 597 |
| | | | 598 |
| 01FD | 02029A | | 599 |
| | | | 600 |
| 0200 | C2AF | | 601 |
| 0202 | 120000 | F | 602 |
| 0205 | 3000F5 | F | 603 |
| | | | 604 |
| 0208 | D2AF | | 605 |
| | | | 606 |
| 020A | 750000 | F | 607 |
| | | | 608 |
| | | | 609 |
| | | | 610 |
| 020D | 7820 | | 611 |
| 020F | E500 | F | 612 |
| 0211 | F2 | | 613 |
| | | | 614 |
| | | | 615 |
| | | | 616 |
| 0212 | E500 | F | 617 |
| 0214 | B41703 | | 618 |
| 0217 | 02022F | | 619 |
| | | | 620 |
| 021A | 5021 | | 621 |
| | | | 622 |
| | | | 623 |
| | | | 624 |
| 021C | C3 | | 625 |
| | | | 626 |
| 021D | 7408 | | 627 |
| 021F | 9500 | F | 628 |
| 0221 | F55A | | 629 |
| | | | 630 |
| 0223 | 7417 | | 631 |
| 0225 | 9500 | F | 632 |
| 0227 | F55B | | 633 |
| | | | 634 |
| 0229 | 755C01 | | 635 |
| | | | 636 |
| 022C | 02024D | | 637 |
| | | | 638 |
| 022F | E500 | F | 639 |
| 0231 | B40805 | | 640 |
| | | | 641 |
| | | | 642 |
| | | | 643 |
| LOC | OBJ | | LINE |
| 0234 | 755C03 | | 644 |
| 0237 | 8014 | | 645 |
| | | | 646 |
| 0239 | 5002 | | 647 |
| | | | 648 |
| | | | 649 |
| | | | 650 |
| 023B | 80DF | | 651 |
| | | | 652 |
| | | | 653 |
| | | | 654 |
| 023D | C3 | | 655 |
| 023E | 7410 | | 656 |
| 0240 | 9500 | F | 657 |
| 0242 | F55A | | 658 |
| | | | 659 |
| 0244 | 741E | | 660 |
| 0246 | 9500 | F | 661 |
| 0248 | F55B | | 662 |
| | | | 663 |
| 024A | 755C02 | | 664 |
| | | | 665 |
| | | | 666 |
| | | | 667 |
| 024D | 1208A9 | | 668 |
| 0250 | 1208BA | | 669 |
| | | | 670 |
| 0253 | 7403 | | 671 |
| 0255 | B55C02 | | 672 |
| 0258 | 800E | | 673 |
| | | | 674 |
| 025A | 120841 | | 675 |
| | | | 676 |
| 025D | 301008 | | 677 |
| 0260 | 209702 | | 678 |
| 0263 | 80F8 | | 679 |
| | | | 680 |
| 0265 | 02029A | | 681 |
| | | | 682 |
| | | | 683 |
| | | | 684 |
| 0268 | D22B | | 685 |
| | | | 686 |
| 026A | D2BA | | 687 |
| 026C | D28A | | 688 |
| 026E | D2AA | | 689 |
| | | | 690 |
| | | | 691 |
| | | | 692 |
| | | | 693 |
| | | | 694 |
| | | | 695 |
| | | | 696 |
| 0270 | 201911 | | 697 |
| | | | 698 |
| 0273 | C28C | | 699 |
| 0275 | C28D | | 700 |
| | | | 701 |
| 0277 | 758CE0 | | 702 |
| 027A | 758AFF | | 703 |
| | | | 704 |
| 027D | D28C | | 705 |
| | | | 706 |
| 027F | 308DFD | | 707 |
| 0282 | 8011 | | 708 |
| | | | 709 |
| 0284 | C28E | | 710 |
| 0286 | C28F | | 711 |
| | | | 712 |

```
0288 758DE0
028B 758AFF

028E D28E

0290 300FFD

0293 C28F

0295 C28D

0297 309413


LOC  OBJ                LINE

029A C2AA
029C C2A8
029E C2AF
02A0 0140


02A2 303608

02A5 120306

02A8 7830
02AA 74FF
02AC F2

02AD C292
02AF 101AF0

02B2 120363

02B5 101C40

02B8 303606

02BB 20E218
02BE 20E322

02C1 10012C
02C4 209427

02C7 E500        F

02C9 B40403
02CC 0202F0

02CF 501F

02D1 2000D9
02D4 8027

02D6 1203CB
02D9 12033B

02DC E566
02DE 20E302

02E1 80CA

02E3 1206BC
02E6 12033B

02E9 E566
02EB 20E2E8

02EE 80BD

02F0 C2AA
02F2 C2A8
02F4 C2AF
02F6 0140
02F8 793D
02FA E7
02FB 80BB

02FD C2AA

02FF 3000FD

0302 D2AA
0304 80A7


0306 7843
0308 E6

LOC  OBJ                LINE

0309 B4000F

030C C28C

030E 758CFF
0311 758A00

0314 D28C

0316 208D17
0319 80FB

031B C28E

031D 758DFF
0320 758B00

0323 D28E

0325 208F02
0328 80FB

032A C28E
032C C28F
032E 8004

0330 C28C
0332 C28D

0334 7852
0336 E2
0337 C2E2
0339 F2

033A 22


033B 7840
033D E6
033E 541F
0340 D2E7
0342 F2

0343 22
```

```
0344 C28C
0346 C28D
0348 C28E
034A C28F
034C 22
034D B40001
0350 22
0351 5001
0353 22
0354 C3
0355 33
0356 22
0357 B40002
035A 04
LOC  OBJ    LINE
035B 22
035C 5001
035E 22
035F C3
0360 33
0361 04
0362 22
0363 7840
0365 E2
0366 540F
0368 B40003
036B B224
036D 22
036E C224
0370 E2
0371 B53D01
0374 22
0375 B4F901
0378 22
0379 4001
037B 22
037C B4F002
037F 80FA
0381 201F0A
0384 B4F802
0387 800B
0389 B4F402
038C 8008
038E B4F202
0391 8003
0393 B4F1E5
0396 F53D
0398 1203A2
039B E2
039C B53DD4
039F D21C
03A1 22
03A2 7843
03A4 E6
03A5 B4000F
03A8 C28C
03AA 758CFF
03AD 758AE0
03B0 D28C
03B2 208D11
LOC  OBJ    LINE
03B5 80FB
03B7 C28E
03B9 758DFF
03BC 758BE0
03BF D28E
03C1 208F02
03C4 80FB
03C6 22
03C7 00
03C8 22
03C9 00
03CA 22
03CB D292
03CD D22A
03CF C21D
03D1 C21F
03D3 C21B
03D5 D203
```

| | | |
|---|---|---|
| | | 1011 |
| 03D7 | 7852 | 1012 |
| 03D9 | E4 | 1013 |
| 03DA | D2E6 | 1014 |
| 03DC | F2 | 1015 |
| | | 1016 |
| 03DD | 301B13 | 1017 |
| | | 1018 |
| 03E0 | 7106 | 1019 |
| | | 1020 |
| 03E2 | 202C08 | 1021 |
| 03E5 | 120709 | 1022 |
| | | 1023 |
| 03E8 | 120774 | 1024 |
| | | 1025 |
| 03EB | 8008 | 1026 |
| | | 1027 |
| 03ED | DA06 | 1028 |
| 03EF | C22C | 1029 |
| 03F1 | 80F2 | 1030 |
| | | 1031 |
| 03F3 | 7106 | 1032 |
| | | 1033 |
| 03F5 | 7163 | 1034 |
| 03F7 | 101C23 | 1035 |
| | | 1036 |
| 03FA | 20010E | 1037 |
| 03FD | 120422 | 1038 |
| 0400 | 20E308 | 1039 |
| | | 1040 |
| 0403 | 101BDA | 1041 |
| 0406 | 1205F9 | 1042 |
| 0409 | 80EA | 1043 |
| | | 1044 |
| 040B | F566 | 1045 |
| 040D | C22A | 1046 |
| 040F | C21D | 1047 |
| 0411 | C203 | 1048 |
| LOC | OBJ | LINE |
| 0413 | C21F | 1049 |
| 0415 | C292 | 1050 |
| | | 1051 |
| 0417 | 7852 | 1052 |
| 0419 | E2 | 1053 |
| 041A | E4 | 1054 |
| 041B | F2 | 1055 |
| | | 1056 |
| 041C | 22 | 1057 |
| | | 1058 |
| 041D | 783D | 1059 |
| 041F | E6 | 1060 |
| 0420 | 80D8 | 1061 |
| | | 1062 |
| | | 1063 |
| | | 1064 |
| | | 1065 |
| | | 1066 |
| | | 1067 |
| | | 1068 |
| 0422 | C0E0 | 1069 |
| 0424 | 20E006 | 1070 |
| 0427 | 20E10D | 1071 |
| 042A | D0E0 | 1072 |
| | | 1073 |
| 042C | 22 | 1074 |
| | | 1075 |
| 042D | C223 | 1076 |
| | | 1077 |
| 042F | 7852 | 1078 |
| 0431 | E2 | 1079 |
| 0432 | D2E4 | 1080 |
| 0434 | F2 | 1081 |
| | | 1082 |
| 0435 | 8008 | 1083 |
| | | 1084 |
| 0437 | D223 | 1085 |
| | | 1086 |
| 0439 | 7852 | 1087 |
| 043B | E2 | 1088 |
| 043C | C2E4 | 1089 |
| 043E | F2 | 1090 |
| | | 1091 |
| 043F | D22E | 1092 |
| 0441 | D21F | 1093 |
| 0443 | D231 | 1094 |
| | | 1095 |
| 0445 | 7830 | 1096 |
| 0447 | 74FF | 1097 |
| 0449 | F2 | 1098 |
| | | 1099 |
| 044A | 30190F | 1100 |
| | | 1101 |
| 044D | 758951 | 1102 |
| | | 1103 |
| 0450 | C28C | 1104 |
| 0452 | 758CF0 | 1105 |
| 0455 | 758A00 | 1106 |
| | | 1107 |
| 0458 | D28C | 1108 |
| 045A | 800D | 1109 |
| | | 1110 |
| 045C | 758915 | 1111 |
| | | 1112 |
| 045F | C28E | 1113 |
| 0461 | 758DF0 | 1114 |
| 0464 | 758D00 | 1115 |
| | | 1116 |
| 0467 | D28E | 1117 |
| | | 1118 |
| 0469 | 754900 | 1119 |
| | | 1120 |
| 046C | 0549 | 1121 |
| 046E | E549 | 1122 |
| | | 1123 |
| 0470 | B41A04 | 1124 |
| | | 1125 |
| 0473 | 1549 | 1126 |
| 0475 | 8042 | 1127 |
| | | 1128 |
| 0477 | 5040 | 1129 |
| LOC | OBJ | LINE |
| | | 1130 |
| 0479 | 120754 | 1131 |
| | | 1132 |
| 047C | 7A04 | 1133 |
| 047E | 30191C | 1134 |
| | | 1135 |
| 0481 | 208D05 | 1136 |
| 0484 | 101A10 | 1137 |
| 0487 | 80F8 | 1138 |
| | | 1139 |
| 0489 | C28D | 1140 |
| | | 1141 |
| | | 1142 |
| 048B | 7163 | 1143 |
| | | 1144 |
| 048D | 201C3A | 1145 |
| 0490 | 202437 | 1146 |
| | | 1147 |
| 0493 | DAEC | 1148 |
| 0495 | 80D5 | 1149 |
| | | 1150 |
| 0497 | 7106 | 1151 |
| 0499 | D28C | 1152 |
| 049B | 80E4 | 1153 |
| | | 1154 |
| 049D | 208F05 | 1155 |
| 04A0 | 101A10 | 1156 |
| 04A3 | 80F8 | 1157 |
| | | 1158 |
| 04A5 | C28F | 1159 |
| | | 1160 |

```
04A7 7163

04A9 201C1E
04AC 20241B

04AF DAEC
04B1 80B9

04B3 7106
04B5 D28E
04B7 80E4

04B9 7163

04BB 101A08
04BE 201C09
04C1 202406

04C4 80F3

04C6 7106
04C8 80F4

04CA 7A04
04CC 30190C

04CF C28C
04D1 758CF0
04D4 758A00

04D7 D28C
04D9 801C

04DB C28E

04DD 758DF0
04E0 758B00

04E3 D28E

04E5 208F05
04E8 101A08
04EB 80F8

04ED C28F
04EF DAF4
04F1 8010

04F3 7106
04F5 80EE

LOC  OBJ       LINE

04F7 208D05
04FA 101A06
04FD 80F8

04FF C28D

0501 DAF4

0503 758955

0506 8549F0
0509 74B6

050B A4

050C F545
050E 85F044
0511 853146

0514 120000    F

0517 E548
0519 C3

051A 20230E

051D E537
051F 9548
0521 F537

0523 E538
0525 9400
0527 F538

0529 8029

052B 2537
052D F537

052F E4
0530 3538
0532 F538

0534 E538
0536 B56307
0539 E537
053B B56212
053E 802F

0540 402D

0542 E4
0543 C3

0544 E537
0546 9562
0548 FE

0549 E538
054B 9563
054D FF

054E 8024

0550 50F0
0552 801B

0554 E538
0556 B56107

0559 E537
055B B56002
055E 800F

LOC  OBJ       LINE
0560 500D

0562 C3

0563 E560
0565 9537
0567 FE

0568 E561
056A 9538
056C FF

056D 8005

056F 1203B1

0572 8003
```

```
0574 120596

0577 D22C
0579 7A02

057B D21E
057D D230
057F C22E
0581 C21F
0583 C231

0585 D0E0
0587 22

0588 C3
0589 7410
058B 9559
058D F537

058F 740E
0591 9558
0593 F538

0595 22

0596 302329

0599 D225
059B D226

059D B188

059F C3

05A0 E562
05A2 9537
05A4 FB

05A5 E563
05A7 7538
05A9 FC

05AA C3

05AB EB
05AC 13
05AD F55A

05AF EC
05B0 13
05B1 F55B

05B3 B188

05B5 C3

05B6 E537
05B8 2E
05B9 F537

05BB E538
05BD 3F
05BE F538

05C0 8030

05C2 D225
05C4 D226

05C6 B188

05C8 C3

05C9 E560
05CB 2410
05CD FB

05CE E561
05D0 340E
05D2 FC

05D3 C3

05D4 EB
05D5 2535
05D7 FB

05D8 EC
05D9 3536
05DB FC

05DC C3

05DD EB
05DE 13
05DF F55A

05E1 EC
05E2 13
05E3 F55D

05E5 B188

05E7 C3

05E8 E537
05EA 9E
05EB E537

05ED E538
05EF 9F
05F0 E538

05F2 2026FD
05F5 2027FD
05F8 22

05F9 30974C

05FC 7134

05FE C2AA
0600 C200
0602 D205

0604 7830
0606 74CD
0608 F2

0609 1208DD
```

```
060C E4
060D 20190C
0610 758B00
0613 758D00
0616 C28E
0618 D28E
061A 800A
061C 758A00
061F 758C00
0622 C28D
0624 D28D
0626 200010
0629 201905
062C 208F07
062F 80F5
0631 208D02
0634 80F0
0636 020040
0639 20190D
063C C28E
063E E58D
0640 F55F
0642 E58B
0644 F55E
0646 800B
0648 22
0649 C28C
064B E58C
064D F55F
064F E58A
0651 F55E
0653 C3
0654 E55E
0656 9410
0658 F55E
065A E55F
065C 940E
065E F55F
0660 50F1
0662 E55E
0664 2410
0666 F55E
0668 E55F
066A 340E
066C F55F
066E C3
066F E55E
0671 33
0672 F55E
0674 E55F
0676 33
0677 F55F
0679 7400
067B B55E05
067E B55F02
0681 8034
0683 C3
0684 7410
0686 955E
0688 740E
068A 955F
068C 4010
068E 7410
0690 955E
0692 855E5A
0695 740E
0697 955F
0699 855F5B
069C 800D
069E C3
069F E55E
06A1 7410
06A3 F55A
06A5 E55F
06A7 940E
06A9 F55B
06AB D220
06AD 302002
06B0 80FB
06B2 300602
06B5 80FB
06B7 D22C
06B9 7A04
06BB 22
06DC D292
06DE D21B
06C0 C21F
06C2 D204
06C4 7852
06C6 E2
06C7 E4
06C8 D2E5
06CA F2
06CB 301B10
```

```
06CE 7106

06D0 202C05
06D3 120709
06D6 8003

06D8 DA06
06DA C22C
06DC 8002

06DE 7106

06E0 7163

06E2 101C1F

06E5 20010C
06E8 9122
06EA 20E207

06ED 101BDE
06F0 B1F9
06F2 80EC

06F4 F566

06F6 C21D
06F8 C292
06FA C204
06FC C21F

06FE 7852
0700 E2
0701 E4
0702 F2

0703 22

0704 793D
0706 E7
0707 80D7



0709 203054
070C 300203

070F 7852
0711 E2
0712 D2E4
0714 F2

0715 8006

0717 7852
0719 E2
071A C2E4
071C F2


071D E531
071F 855DE0

0722 A4

0723 85F044
0726 F545
0728 7546B6

072B 120000 F

072E E548
0730 C3
0731 9532
0733 F548

0735 4002
0737 8003

0739 754800

073C EF
073D 7024

073F C22F

0741 E548
0743 F542



0745 D40002

0748 801D

074A 4014

074C B46405

074F D22F
0751 020763

0754 500D

0756 75F00A
0759 84
075A C4
075B 25F0

075D 7830
075F F2

0760 C230
0762 22

0763 7499
0765 80F6

0767 7852
0769 D21E

076B E2
076C C2E0
076E C2E1
0770 F2

0771 E4

0772 80E9



0774 101E3C

0777 1207B3
077A 1207BC

077D 200229
```

```
0780 7952
0782 E3
0783 C2E1
0785 D2E0
0787 F3

0788 7842
078A E6
078B 75F014
078E A4

078F F8
0790 A9F0

0792 C3
0793 9564
0795 E5F0
0797 9565

0799 4005

079B E8
079C 89F0
079E 8005


07A0 8565F0
07A3 E564

07A5 1208C8
07A8 22

07A9 7952
07AB E3
07AC C2E0
07AE D2E1
07B0 F3

07B1 80D5

07B3 7952
07B5 E3
07B6 C2E0
07B8 C2E1
07BA F3

07BB 22







07BC 301922

07BF 758951

07C2 C28C
07C4 758C00
07C7 758A00

07CA 2095FD

07CD 3095FD

07D0 D28C

07D2 2095FD

07D5 3095FD

07D8 C28C

07DA E58C
07DC 858AF0

07DF 8020

07E1 758915

07E4 C28E
07E6 758D00
07E9 758B00

07EC 2095FD

07EF 3095FD

07F2 D28E

07F4 2095FD

07F7 3095FD

07FA C28E

07FC E58D
07FE 858BF0

0801 120344
0804 758955

0807 F544
0809 85F045

080C AAF0
080E 75460A

0811 120000     F

0814 754407
0817 7545E7

081A E548

081C B40A02
081F 8005

0821 5003

0823 D233
0825 EA

0826 F546

0828 120000     F

082B E548
082D 103307

0830 F564
0832 756500

0835 8007

0837 75F00A

083A A4

083B F564
083D 85F065

0840 22
```

```
0841 E55C
0843 7401
0845 6021

0847 C3

0848 E55A
084A 2408
084C F4
084D 201907

0850 C28C
0852 F58A
0854 02085B

0857 C28E
0859 F58B

085B E55B
085D 3407
085F F4

0860 201922

0863 F58C
0865 020887

0868 C3
0869 E55A
086B F4
086C 201907

086F C28C
0871 F58A
0873 02087A

0876 C28E
0878 F58B
087A E55B
087C F4
087D 201905

0880 F58C
0882 020887

0885 F58D

0887 D218

0889 22

088A E55A
088C F53C

088E E55B
0890 F53B

0892 0208A0

0895 7434
0897 7803
0899 F2

089A 753B0E
089D 753C10

08A0 7800

08A2 E53C
08A4 F2

08A5 E53B
08A7 F2

08A8 22

08A9 747A
08AB 7803
08AD F2

08AE 120538

08B1 7801

08B3 E537
08B5 F2

08B6 E538
08B8 F2

08B9 22

08BA 74B2
08BC 7803
08BE F2

08BF 7802

08C1 E535
08C3 F2

08C4 E536
08C6 F2

08C7 22

08C8 7813
08CA C0E0

08CC 7430
08CE F2

08CF D0E0

08D1 7810
08D3 F2
08D4 C5F0
08D6 F2

08D7 22
```

```
08D8 74D2
08DA 7813
08DC F2

08DD 7812

08DF E534
08E1 F2

08E2 E533
08E4 F2

08E5 22


08E6 C0E0
08E8 C0F0
08EA E8
08EB C0E0
08ED E9
08EE C0E0

08F0 C235
08F2 C232

08F4 309712

08F7 C2AA

08F9 C200
08FB D205

08FD 7852
08FF E2
0900 C2E0
0902 C2E1
0904 F2

0905 11DD
0907 8027

0909 30000E
090C 10182C

090F 102051
0912 100654

0915 202555

0918 8016

091A 209713


091D C3
091E 7812

0920 E534
0922 2419
0924 F2

0925 E4
0926 8533F0
0929 35F0
092B F2

092C D200

092E D2AA

0930 D0E0
0932 F9
0933 D0E0
0935 F8
0936 D0F0
0938 D0E0
093A 32


093B C2AF
093D C290
093F C3

0940 E543
0942 9400
0944 7007

0946 D28C
0948 208D09
094B 80FB

094D D28E
094F 208F02
0952 80FB

0954 D2AF
0956 D290

0958 D0E0
095A F9
095B D0E0
095D F8
095E D0F0
0960 D0E0
0962 32

0963 118A

0965 D206
0967 80C7

0969 119A

096B 80C3

096D C2AA
096F 102708

0972 118A

0974 D227
0976 C226

0978 80B6

097A 119A
097C C225
097E D2AA

0980 11B1

0982 80AC

0984 D201
0986 80A8
```

```
0988 00
0989 32
098A C0D0
098C C0E0
098E C0F0
0990 E8
0991 C0E0
0993 E9
0994 C0E0
0996 20351D
0999 D235
099B 7802
099D 793E
099F E2
09A0 F7
09A1 09
09A2 E2
09A3 F7
09A4 7852
09A6 E2
09A7 D2E2
09A9 F2
09AA D21A
09AC D21B
09AE E53F
09B0 B4FF06
09B3 020A55
09B6 020A1E
09B9 202C21
09BC 203702
09BF 0500        F
09C1 C3
09C2 E53E
09C4 9559
09C6 FE
09C7 E53F
09C9 9558
09CB FF
09CC 5012
09CE C3
09CF E559
09D1 953E
09D3 FE
09D4 E558
09D6 953F
09D8 FF
09D9 C22D
09DB 8005
09DD 020A55
09E0 D22D
09E2 203645
09E5 BF0011
09E8 BE0A35
09EB C22D
09ED E4
09EE F55D
09F0 750000      F
09F3 D237
09F5 D236
09F7 805C
09F9 20312E
09FC BF0506
09FF 74FF
0A01 F55D
0A03 8098
0A05 5002
0A07 80F6
0A09 7400
0A0B F55D
0A0D 202D04
0A10 C202
0A12 8002
0A14 D202
0A16 20033C
0A19 200439
0A1C 8031
0A1E 8035
0A20 203107
0A23 40C6
0A25 EE
0A26 F55D
0A28 80E3
0A2A 202D35
0A2D C3
0A2E E559
0A30 953E
0A32 F55D
0A34 C202
0A36 20031C
0A39 200419
0A3C B56706
```

```
0A3F 202B0D
0A42 020A73

0A45 4006
0A47 202B05

0A4A 020A73

0A4D C22B

0A4F 7841
0A51 F6

0A52 120A77

0A55 D0E0
0A57 F9
0A58 D0E0
0A5A F8
0A5B D0F0
0A5D D0E0
0A5F D0D0

0A61 32

0A62 C3
0A63 E53E
0A65 9559
0A67 F55D

0A69 D202

0A6B 2003E7
0A6E 2004E4

0A71 80C9

0A73 D201
0A75 80DE

0A77 200215

0A7A C3
0A7B 855DF0

0A7E 7837
0A80 E6

0A81 25F0

0A83 F6

0A84 75F000
0A87 08
0A88 E6

0A89 35F0

0A8B F6

0A8C 11B1

0A8E 22

0A8F 855DF0

0A92 7837
0A94 E6

0A95 C3
0A96 95F0

0A98 F6

0A99 75F000
0A9C 08
0A9D E6

0A9E 95F0

0AA0 F6

0AA1 11B1

0AA3 22

0AA4 00
0AA5 32

0AA6 18
0AA7 10
0AA8 18
0AA9 10
0AAA 18
0AAB 18
0AAC 18
0AAD 18
0AAE 14
0AAF 10
0AB0 0C
0AB1 08
0AB2 06
0AB3 04
0AB4 03
0AB5 02

0AB6 A8
0AB7 A8
0AB8 A8
0AB9 A8
0ABA A8
0ABB 90
0ABC 80
0ABD 70
0ABE 60
0ABF 5E
0AC0 5B
0AC1 54
0AC2 47
0AC3 44
0AC4 38
0AC5 2C

0AC6 0F
0AC7 0E
0AC8 0D
0AC9 0C
0ACA 0B
0ACB 0A
```

```
OACC  09                  2516
OACD  08                  2517
OACE  07                  2518
OACF  06                  2519
OAD0  05                  2520
OAD1  04                  2521
OAD2  03                  2522
OAD3  02                  2523
OAD4  01                  2524
OAD5  00                  2525
                          2526
OAD6  0078                2527
OAD8  0090                2528
OADA  00B4                2529
OADC  00C8                2530
OADE  00E1                2531
OAE0  0101                2532
OAE2  012C                2533
OAE4  0158                2534
OAE6  0190                2535
OAE8  01C2                2536
OAEA  01E0                2537
OAEC  0202                2538
OAEE  0229                2539
OAF0  0258                2540
OAF2  028E                2541
OAF4  02D0                2542
                          2543
                          2544
```

SYMBOL TABLE LISTING

```
N A M E     T Y P E     V A L U E
     A T T R I B U T E S

ACC. . . .   D ADDR   00E0H    A
ADJH . . .   D ADDR   005FH    A
ADJL . . .   D ADDR   005EH    A
ADJU . . .   B ADDR   0024H.0  A
ADRET. . .   B ADDR   0090H.3  A
ADRTE. . .   B ADDR   0090H.2  A
ADV. . . .   C ADDR   03C7H    A
ADVDI. . .   D ADDR   0049H    A
AFLAGS . .   D ADDR   0026H    A
ALG. . . .   C ADDR   -----         EXT
ALGFL. . .   D ADDR   -----         EXT
AUTEM. . .   B ADDR   0025H.2  A
AUTM . . .   B ADDR   0020H.3  A
AUTO . . .   C ADDR   03CDH    A
AUTO1. . .   C ADDR   03E0H    A
AUTO1A . .   C ADDR   03E5H    A
AUTO1B . .   C ADDR   03E8H    A
AUTO1C . .   C ADDR   03EDH    A
AUTO2. . .   C ADDR   03F3H    A
AUTO3. . .   C ADDR   03F5H    A
AUTO4. . .   C ADDR   03FAH    A
AUTO4A . .   C ADDR   0403H    A
AUTO5. . .   C ADDR   040BH    A
AUTO6. . .   C ADDR   041DH    A
B. . . . .   D ADDR   00F0H    A
BINLK. . .   B ADDR   0020H.5  A
BPASS. . .   B ADDR   0025H.6  A
COGO . . .   B ADDR   0090H.0  A
CALC . . .   C ADDR   0121H    A
CALC1. . .   C ADDR   0137H    A
CETR . . .   B ADDR   0023H.0  A
CLED . . .   C ADDR   033DH    A
CLFL . . .   C ADDR   0344H    A
CNTID. . .   B ADDR   0023H.1  A
CNUMB. . .   D ADDR   0043H    A
COMPV. . .   D ADDR   0067H    A
CPAR . . .   C ADDR   0212H    A
CPAR1. . .   C ADDR   021AH    A
CPAR2. . .   C ADDR   021CH    A
CPAR3. . .   C ADDR   022FH    A
CPAR4. . .   C ADDR   0239H    A
CPAR6. . .   C ADDR   023DH    A
CPAR6A . .   C ADDR   024DH    A
CPAR6B . .   C ADDR   0250H    A
CPAR7. . .   C ADDR   025AH    A
CPAR8. . .   C ADDR   025DH    A
CPAR8A . .   C ADDR   0265H    A
CPAR9. . .   C ADDR   0268H    A
CPRCR. . .   C ADDR   0588H    A
CVALU. . .   D ADDR   0039H    A  PUB
CWU2 . . .     NUMB   0003H    A
CWU40. . .     NUMB   0013H    A
CWU5 . . .     NUMB   0053H    A
CYCLE. . .   D ADDR   0064H    A
CYCLEH . .   D ADDR   0065H    A
DBNC . . .   C ADDR   03A2H    A
DBNC1. . .   C ADDR   03B2H    A
DBNC2. . .   C ADDR   03B7H    A
DBNC3. . .   C ADDR   03C1H    A
DBNC4. . .   C ADDR   03C6H    A
DEFLR. . .   B ADDR   0025H.5  A
DFAV . . .   C ADDR   00C3H    A
DFAV2. . .   C ADDR   00C7H    A
DFAV2A . .   C ADDR   00CEH    A
DFAV2B . .   C ADDR   00D3H    A
DFAV3. . .   C ADDR   00D7H    A
DFAV3A . .   C ADDR   00DAH    A
DFAV3B . .   C ADDR   00DFH    A
DFAV3C . .   C ADDR   00E4H    A
DFAV4. . .   C ADDR   00E8H    A
DFAV4A . .   C ADDR   00EBH    A
DFAV4B . .   C ADDR   00F0H    A
DFAV4C . .   C ADDR   00F5H    A
DFAV5. . .   C ADDR   00F9H    A
DFAV6. . .   C ADDR   00FBH    A
DFAV6A . .   C ADDR   00FEH    A
DFAV6B . .   C ADDR   0103H    A
DFAV6C . .   C ADDR   0108H    A
DFAV6D . .   C ADDR   010CH    A
DFAV7. . .   C ADDR   010EH    A
DFAV7A . .   C ADDR   0111H    A
DFAV7B . .   C ADDR   0116H    A
DFAV7C . .   C ADDR   011BH    A
DFAV7D . .   C ADDR   011FH    A
DIG. . . .   B ADDR   0090H.1  A
DIGT . . .   C ADDR   01E9H    A
DIGT0. . .   C ADDR   01EFH    A
DIGT1. . .   C ADDR   01F5H    A
DIGT1A . .   C ADDR   01FDH    A
DIGT2. . .   C ADDR   0200H    A
DISCN. . .   D ADDR   0040H    A
DISP . . .     NUMB   0030H    A
DISPL. . .   C ADDR   0709H    A
DISPL1 . .   C ADDR   0717H    A
DISPL2 . .   C ADDR   074AH    A
DISPL3 . .   C ADDR   0754H    A
DISPL4 . .   C ADDR   075DH    A
DISPL5 . .   C ADDR   0760H    A
DISPL7 . .   C ADDR   0763H    A
DISPL8 . .   C ADDR   0767H    A
DISPLA . .   C ADDR   071DH    A
DISPLB . .   C ADDR   073CH    A
DIV1H. . .   D ADDR   0047H    A  PUB
DIV1L. . .   D ADDR   0048H    A  PUB
DIVAL. . .   D ADDR   0042H    A
DIVI . . .   C ADDR   -----         EXT
DIVIDH . .   D ADDR   0044H    A  PUB
DIVIDL . .   D ADDR   0045H    A  PUB
DIVIS. . .   D ADDR   0046H    A  PUB
DSPLA1 . .   C ADDR   0739H    A
DZONE. . .   D ADDR   0032H    A
DZONTB . .   C ADDR   0AC6H    A
EA . . . .   B ADDR   00A8H.7  A
EARLY. . .   B ADDR   0020H.2  A
ENAIN. . .   B ADDR   0025H.1  A
EX0. . . .   B ADDR   00A8H.0  A
EX1. . . .   B ADDR   00A8H.2  A
EXR0 . . .   C ADDR   08E6H    A
EXR01. . .   C ADDR   091AH    A
EXR01A . .   C ADDR   091DH    A
EXR02. . .   C ADDR   0930H    A
EXR03. . .   C ADDR   093BH    A
EXR04. . .   C ADDR   0948H    A
EXR05. . .   C ADDR   094DH    A
EXR06. . .   C ADDR   094FH    A
EXR07. . .   C ADDR   0954H    A
EXR08. . .   C ADDR   0963H    A
EXR09. . .   C ADDR   0969H    A
EXR0A. . .   C ADDR   096DH    A
EXR0B. . .   C ADDR   097AH    A
EXR0C. . .   C ADDR   0984H    A
EXR1 . . .   C ADDR   098AH    A
EXR11. . .   C ADDR   0A45H    A
EXR12. . .   C ADDR   0A4DH    A
EXR13. . .   C ADDR   0A4FH    A
EXR14. . .   C ADDR   0A55H    A
EXR1A. . .   C ADDR   09B9H    A
EXR1B. . .   C ADDR   09C1H    A
EXR1C. . .   C ADDR   09DDH    A
EXR1D. . .   C ADDR   09D6H    A
```

| | | | | | |
|---|---|---|---|---|---|
| EXR2 . . . | C | ADDR | 09E0H | A | |
| EXR20. . . | C | ADDR | 0A62H | A | |
| EXR3 . . . | C | ADDR | 09E2H | A | |
| EXR31. . . | C | ADDR | 0A73H | A | |
| EXR3A. . . | C | ADDR | 09EDH | A | |
| EXR4 . . . | C | ADDR | 09F9H | A | |
| EXR41. . . | C | ADDR | 0A0DH | A | |
| EXR4A. . . | C | ADDR | 09FFH | A | |
| EXR4B. . . | C | ADDR | 0A05H | A | |
| EXR4C. . . | C | ADDR | 0A09H | A | |
| EXR5 . . . | C | ADDR | 0A14H | A | |
| EXR51. . . | C | ADDR | 0A16H | A | |
| EXR52. . . | C | ADDR | 0A1EH | A | |
| EXR53. . . | C | ADDR | 0A20H | A | |
| EXR6 . . . | C | ADDR | 0A2AH | A | |
| EXR7 . . . | C | ADDR | 0A3CH | A | |
| EXRA . . . | C | ADDR | 08F4H | A | |
| EXRB . . . | C | ADDR | 0909H | A | |
| FCNT . . . | C | ADDR | 01B0H | A | |
| FCNT1. . . | C | ADDR | 01CDH | A | |
| FCNT2. . . | C | ADDR | 01D5H | A | |
| FCNT3. . . | C | ADDR | 01E0H | A | |
| FIXIT. . . | C | ADDR | 034DH | A | |
| FIXIT1 . . | C | ADDR | 0351H | A | |
| FIXIT2 . . | C | ADDR | 0354H | A | |
| FIXIT3 . . | C | ADDR | 0357H | A | |
| FIXIT4 . . | C | ADDR | 035CH | A | |
| FIXIT5 . . | C | ADDR | 035FH | A | |
| FLAGS. . . | D | ADDR | 0020H | A | |
| GARD . . . | B | ADDR | 0026H.6 | A | |
| GATCN. . . | C | ADDR | 08BAH | A | |
| GATCN1 . . | C | ADDR | 08BFH | A | |
| GATE . . . | D | ADDR | 0030H | A | |
| GATECH . . | D | ADDR | 0036H | A | PUB |
| GATECL . . | D | ADDR | 0035H | A | PUB |
| GATETB . . | C | ADDR | 0AA6H | A | |
| GOADJ. . . | B | ADDR | 0024H.1 | A | |
| GTBM . . . | B | ADDR | 0026H.1 | A | |
| HGATEH . . | D | ADDR | 0058H | A | PUB |
| HGATEL . . | D | ADDR | 0059H | A | PUB |
| ILOKH. . . | D | ADDR | 0033H | A | |
| ILOKL. . . | D | ADDR | 0034H | A | |
| ILOKTB . . | C | ADDR | 0AD6H | A | |
| IMPO . . . | D | ADDR | 0031H | A | |
| IMPTB. . . | C | ADDR | 0AD4H | A | |
| INIT . . . | C | ADDR | 0040H | A | |
| INLKS. . . | B | ADDR | 0020H.0 | A | |
| INTER. . . | C | ADDR | 08D8H | A | |
| INTER1 . . | C | ADDR | 08DDH | A | |
| IT0. . . . | B | ADDR | 0088H.0 | A | |
| IT1. . . . | B | ADDR | 0088H.2 | A | |
| ITC0 . . . | C | ADDR | 0788H | A | |
| ITC1 . . . | C | ADDR | 0AA4H | A | |
| KDIS . . . | B | ADDR | 0023H.5 | A | |
| KSTR . . . | D | ADDR | 0066H | A | |
| LIGCN. . . | B | ADDR | 0023H.2 | A | |
| LOOP . . . | C | ADDR | 01A3H | A | |
| LOOP1. . . | C | ADDR | 01A5H | A | |
| MADDH. . . | D | ADDR | ---- | | EXT |
| MADDL. . . | D | ADDR | ---- | | EXT |
| MBLKN1 . . | C | ADDR | 0316H | A | |
| MBLKN2 . . | C | ADDR | 031BH | A | |
| MBLKN3 . . | C | ADDR | 0325H | A | |
| MBLKN4 . . | C | ADDR | 032AH | A | |
| MBLKN5 . . | C | ADDR | 0330H | A | |
| MBLKN6 . . | C | ADDR | 0334H | A | |
| MBLNK. . . | C | ADDR | 0306H | A | |
| MCORR0 . . | B | ADDR | 0020H.6 | A | |
| MCORR1 . . | B | ADDR | 0020H.7 | A | |
| MCYCF1 . . | C | ADDR | 0821H | A | |
| MCYCF2 . . | C | ADDR | 0826H | A | |
| MCYCL. . . | C | ADDR | 07BCH | A | |
| MCYCL2 . . | C | ADDR | 07CAH | A | |
| MCYCL3 . . | C | ADDR | 07CDH | A | |
| MCYCL4 . . | C | ADDR | 07D0H | A | |
| MCYCL5 . . | C | ADDR | 07D2H | A | |
| MCYCL6 . . | C | ADDR | 07D5H | A | |
| MCYCL7 . . | C | ADDR | 07D8H | A | |
| MCYCL8 . . | C | ADDR | 07E1H | A | |
| MCYCL9 . . | C | ADDR | 07ECH | A | |
| MCYCLA . . | C | ADDR | 07EFH | A | |
| MCYCLB . . | C | ADDR | 07F2H | A | |
| MCYCLC . . | C | ADDR | 07F4H | A | |
| MCYCLD . . | C | ADDR | 07F7H | A | |
| MCYCLE . . | C | ADDR | 07FAH | A | |
| MCYCLF . . | C | ADDR | 0801H | A | |
| MCYCLG . . | C | ADDR | 0837H | A | |
| MCYCLH . . | C | ADDR | 0840H | A | |
| MFLAGS . . | D | ADDR | 0025H | A | |
| MIDST. . . | C | ADDR | 0841H | A | |
| MIDST1 . . | C | ADDR | 0857H | A | |
| MIDST2 . . | C | ADDR | 085BH | A | |
| MIDST3 . . | C | ADDR | 0868H | A | |
| MIDST4 . . | C | ADDR | 0876H | A | |
| MIDST5 . . | C | ADDR | 087AH | A | |
| MIDST6 . . | C | ADDR | 0885H | A | |
| MIDST7 . . | C | ADDR | 0887H | A | |
| MIPH . . . | D | ADDR | 0061H | A | |
| MIPL . . . | D | ADDR | 0060H | A | |
| MOTCN. . . | C | ADDR | 08C8H | A | |
| MOTCN. . . | B | ADDR | 0023H.3 | A | |
| MPREG. . . | C | ADDR | 0A77H | A | |
| MPREG1 . . | C | ADDR | 0A8FH | A | |
| MPREG2 . . | C | ADDR | 0AA3H | A | |
| MTICN. . . | B | ADDR | 0090H.7 | A | |
| MULT . . . | B | ADDR | 0026H.3 | A | |
| MVALH. . . | D | ADDR | 003FH | A | |
| MVALL. . . | D | ADDR | 003EH | A | |
| MXPH . . . | D | ADDR | 0063H | A | |
| MXPL . . . | D | ADDR | 0062H | A | |
| NCOUNT . . | B | ADDR | 0026H.7 | A | |
| NEWK . . . | B | ADDR | 0023H.4 | A | |
| NFLAGS . . | D | ADDR | 0024H | A | |
| NKEY . . . | B | ADDR | 0024H.4 | A | |
| NLED . . . | B | ADDR | 0023H.6 | A | |
| NROK . . . | | NUMB | 00B6H | A | |
| NTRIG. . . | D | ADDR | ----- | | EXT |
| ONERVA . . | C | ADDR | 088AH | A | |
| ONERVB . . | C | ADDR | 0895H | A | |
| ONERVC . . | C | ADDR | 089AH | A | |
| ONERVD . . | C | ADDR | 08A0H | A | |
| ONLY1. . . | B | ADDR | 0026H.5 | A | |
| ONREVH . . | D | ADDR | 003BH | A | |
| ONREVL . . | D | ADDR | 003CH | A | |
| OVERV. . . | B | ADDR | 0026H.4 | A | |
| OVRR . . . | B | ADDR | 0025H.7 | A | |
| P1 . . . . | D | ADDR | 0090H | A | |
| P2 . . . . | D | ADDR | 00A0H | A | |
| PADJ6A . . | C | ADDR | 0469H | A | |
| PADJ91 . . | C | ADDR | 0489H | A | |
| PADJ92 . . | C | ADDR | 0497H | A | |
| PADJA1 . . | C | ADDR | 04A5H | A | |
| PADJA2 . . | C | ADDR | 04B3H | A | |
| PADJB1 . . | C | ADDR | 04BEH | A | |
| PADJB2 . . | C | ADDR | 04C6H | A | |
| PADJB3 . . | C | ADDR | 04CAH | A | |
| PADJB4 . . | C | ADDR | 04DBH | A | |
| PADJB5 . . | C | ADDR | 04E5H | A | |
| PADJB6 . . | C | ADDR | 04EDH | A | |
| PADJB7 . . | C | ADDR | 04F3H | A | |
| PADJB8 . . | C | ADDR | 04F7H | A | |
| PADJB9 . . | C | ADDR | 04FFH | A | |
| PADJBA . . | C | ADDR | 0503H | A | |
| PGADJ. . . | C | ADDR | 0422H | A | |
| PGADJ1 . . | C | ADDR | 042DH | A | |
| PGADJ2 . . | C | ADDR | 0437H | A | |
| PGADJ3 . . | C | ADDR | 043FH | A | |
| PGADJ5 . . | C | ADDR | 044AH | A | |
| PGADJ6 . . | C | ADDR | 045CH | A | |
| PGADJ7 . . | C | ADDR | 046CH | A | |
| PGADJ8 . . | C | ADDR | 0477H | A | |
| PGADJ9 . . | C | ADDR | 0481H | A | |
| PGADJA . . | C | ADDR | 049DH | A | |
| PGADJB . . | C | ADDR | 04B9H | A | |
| PGADJC . . | C | ADDR | 052BH | A | |
| PGADJD . . | C | ADDR | 0540H | A | |
| PGADJE . . | C | ADDR | 0542H | A | |
| PGADJF . . | C | ADDR | 0550H | A | |
| PGADJG . . | C | ADDR | 0554H | A | |
| PGADJH . . | C | ADDR | 0560H | A | |
| PGADJI . . | C | ADDR | 056DH | A | |
| PGADJK . . | C | ADDR | 056FH | A | |
| PGADJL . . | C | ADDR | 0574H | A | |
| PGADJM . . | C | ADDR | 0577H | A | |
| PREGT. . . | C | ADDR | 08A2H | A | |
| PREGT0 . . | C | ADDR | 08AEH | A | |
| PREGT1 . . | C | ADDR | 08B1H | A | |
| PREGTH . . | D | ADDR | 0038H | A | |
| PREGTL . . | D | ADDR | 0037H | A | |
| PRESVH . . | D | ADDR | 005BH | A | |
| PRESVL . . | D | ADDR | 005AH | A | |
| PSUP . . . | C | ADDR | 008CH | A | |
| PSUP2. . . | C | ADDR | 00C1H | A | |
| PSW. . . . | D | ADDR | 00D0H | A | |
| PX0. . . . | B | ADDR | 00B8H.0 | A | |
| PX1. . . . | B | ADDR | 00B8H.2 | A | |
| RAERV. . . | D | ADDR | 0041H | A | |
| RAWCR. . . | B | ADDR | 0025H.3 | A | |
| RAWR . . . | D | ADDR | 005DH | A | |
| RCPR . . . | B | ADDR | 0024H.5 | A | |
| RCPR1. . . | B | ADDR | 0024H.6 | A | |
| RCPR2. . . | B | ADDR | 0024H.7 | A | |
| RCPRG. . . | C | ADDR | 0596H | A | |
| RCPRG1 . . | C | ADDR | 05C2H | A | |

```
RCPRG2 . .  C ADDR   05F2H    A
RCPRG3 . .  C ADDR   05F5H    A
RDIO . . .    NUMB   3E10H    A
RERRF. . .  B ADDR   0020H.1  A
RETD . . .  C ADDR   03C9H    A
RETK . . .  B ADDR   0024H.3  A
RILF . . .  B ADDR   0024H.2  A
RMOT . . .  C ADDR   0774H    A
RMOT1. . .  C ADDR   0788H    A
RMOT1C . .  C ADDR   07A0H    A
RMOT1D . .  C ADDR   07A5H    A
RMOT2. . .  C ADDR   07A9H    A
RMOT3. . .  C ADDR   07B3H    A
RTCNT. . .  B ADDR   0090H.4  A
SALGFL . .  D ADDR   -----      EXT
SEIN2A . .  C ADDR   0610H    A
SEIN4A . .  C ADDR   0631H    A
SEIN4B . .  C ADDR   0636H    A
SEIN5A . .  C ADDR   0640H    A
SEINT. . .  C ADDR   05F7H    A
SEINT2 . .  C ADDR   060DH    A
SEINT3 . .  C ADDR   061CH    A
SEINT4 . .  C ADDR   0626H    A
SEINT5 . .  C ADDR   0639H    A
SEINT6 . .  C ADDR   0649H    A
SEINT7 . .  C ADDR   0653H    A
SEINT8 . .  C ADDR   0683H    A
SEINT9 . .  C ADDR   069EH    A
SEINTA . .  C ADDR   06ABH    A
SEINTB . .  C ADDR   06ADH    A
SEINTC . .  C ADDR   06D2H    A
SEINTD . .  C ADDR   06B7H    A
SKDI . . .  B ADDR   0026H.0  A
SLEW . . .  B ADDR   0023H.7  A
SMRK . . .  D ADDR   005CH    A
SP . . . .  D ADDR   0081H    A
SREST. . .  B ADDR   0020H.6  A
SSC01. . .  C ADDR   0126H    A
SSC02. . .  C ADDR   012FH    A
SVALU. . .  D ADDR   003AH    A PUB
SWCHT. . .  C ADDR   0363H    A
SWCHT1 . .  C ADDR   036EH    A
SWCHT2 . .  C ADDR   0375H    A
SWCHT3 . .  C ADDR   03A1H    A
SWCHT6 . .  C ADDR   0379H    A
SWCHT7 . .  C ADDR   037BH    A
SWCHT8 . .  C ADDR   037CH    A
SWCHT9 . .  C ADDR   0381H    A
SWCHTA . .  C ADDR   0396H    A
SWCHTB . .  C ADDR   0387H    A
SWCHTC . .  C ADDR   038EH    A
SWCHTD . .  C ADDR   0393H    A
SWIT . . .  D ADDR   003DH    A
SWT. . . .    NUMB   0040H    A
SYNCR. . .  B ADDR   0026H.2  A
TESM . . .  B ADDR   0020H.4  A
TEST . . .  C ADDR   06DCH    A
TEST1. . .  C ADDR   06CEH    A
TEST1A . .  C ADDR   06D8H    A
TEST2. . .  C ADDR   06DCH    A
TEST3. . .  C ADDR   06E0H    A
TEST4. . .  C ADDR   06E5H    A
TEST5. . .  C ADDR   06EDH    A
TEST6. . .  C ADDR   06F4H    A
TEST7. . .  C ADDR   0704H    A
TF0. . . .  B ADDR   0088H.5  A
TF1. . . .  B ADDR   0088H.7  A
TH0. . . .  D ADDR   008CH    A
TH1. . . .  D ADDR   008DH    A
TL0. . . .  D ADDR   008AH    A
TL1. . . .  D ADDR   008BH    A
TMOD . . .  D ADDR   0089H    A
TR0. . . .  B ADDR   0088H.4  A
TR1. . . .  B ADDR   0088H.6  A
TRIG . . .  D ADDR   -----      EXT
U5A. . . .    NUMB   0050H    A
U5B. . . .    NUMB   0051H    A
U5C. . . .    NUMB   0052H    A
WAIT . . .  C ADDR   02A2H    A
WAIT10 . .  C ADDR   02F8H    A
WAIT11 . .  C ADDR   02FDH    A
WAIT12 . .  C ADDR   02FFH    A
WAIT5. . .  C ADDR   02ADH    A
WAIT6. . .  C ADDR   02B8H    A
WAIT6A . .  C ADDR   02C1H    A
WAIT6B . .  C ADDR   02CFH    A
WAIT7. . .  C ADDR   02D6H    A
WAIT8. . .  C ADDR   02E3H    A
WAIT9. . .  C ADDR   02F0H    A
WAL0 . . .  C ADDR   0270H    A
WAL01. . .  C ADDR   027FH    A
WAL02. . .  C ADDR   0284H    A
WAL03. . .  C ADDR   0290H    A
WAL04. . .  C ADDR   0295H    A
WAL05. . .  C ADDR   029AH    A
WINT1. . .  B ADDR   0025H.0  A
XFLAGS . .  D ADDR   0023H    A
ZERO . . .  B ADDR   0025H.4  A

REGISTER BANK(S) USED: 0

ASSEMBLY COMPLETE, NO ERRORS FOUND
```

What is claimed is:

1. A method of acquiring and maintaining a register condition for successive repeat lengths of a web that is acted on by work applying means of a web operating apparatus which also has adjusting means for adjusting the position of said repeat lengths relative to said work applying means, comprising the steps of:

(a) scanning the web to produce a scanner output and digitizing the output into a plurality of successive data samples;

(b) storing the digitzed data samples to form a digital map of a cross-section of the web image;

(c) processing the stored digitized data samples to determine the location of contrast changes which conform to predetermined conditions by identifying regions of contrast change and determining slope values between maximum and minimum light levels in the contrast change region and storing the location of at least one contrast change region in response to the slope value meeting predetermined conditions;

(d) determining at least one control mark from the located contrast changes and storing the location of at least one control mark;

(e) detecting the location of at least one control mark for each successive repeat length;

(f) measuring the difference between the stored location of at least one of said control marks and the detected location of the respective control mark and generating an error signal in response to said difference;

(g) driving the adjusting means to selectively advance or retard the position of the repeat lengths in response to the error signal.

2. The method of claim 1 wherein said error signal indicates the magnitude of the measured difference and whether the control mark was detected before or after the stored location.

3. The method of claim 1 further comprising the step of generating at least one time window of predetermined duration around each control mark stored location and disregarding any control marks that are outside the time windows.

4. The method of claim 2 wherein the step of driving said adjusting means further comprises energizing a synchronous motor in a first direction when said control mark is advanced and in a second direction when said control mark is retarded, the energization occurring for a time that varies in proportion to the magnitude of the error signal.

5. The method of claim 1 wherein the step of determining comprises identifying contrast change regions adjacent to the located and stored contrast change regions and discarding any located and stored regions having adjacent regions within a predetermined time window while retaining as control marks at least one of those located and stored regions remaining.

6. The method of claim 5 wherein the location and duration of said time window is programmable.

7. The method of claim 5 wherein a comparator threshold value is computed for each control mark retained responsive to the minimum and maximum light level of the contrast change region of each respective control mark.

8. The method of claim 7 wherein the step of determining further comprises comparing scanner output for at least one additional repeat length to the comparator threshold during the corresponding time window for each control mark to detect the location of the control mark and discarding those control marks which differ from their stored location in excess of a predetermined amount.

9. The method of claim 8 wherein the method is repeated starting with the step of storing and digitizing in response to all control marks being discarded.

10. The method of claim 5 wherein the step of determining further comprises monitoring the difference over successive repeat lengths between the detected location of retained control marks and the respective stored initial locations of each control mark, and discarding control marks in response to the difference.

11. The method of claim 2 wherein the step of driving the adjusting means further comprises inhibiting the driving of the adjusting means in response to said measured difference being less than a predetermined minimum.

12. The method of claim 2, wherein the step of driving the adjusting means further comprises energizing a motor in a first direction when said control mark is advanced and in a second direction when said control mark is retarded, the energization occurring for a time and at a speed that varies in response to a derivative of the error signal.

13. The method of claim 2 wherein the step of measuring further comprises the step of normalizing the measured difference in location and displaying the normalized difference.

14. A control system, for acquiring and automatically maintaining a register condition for successive repeat lengths of a web that is acted upon by work applying means of a web operating apparatus which also has adjusting means for adjusting the position of said repeat lengths relative to said work applying means, said control system comprising:

(a) means for scanning the web to produce a scanner output and for digitizing the output into a plurality of successive data samples;

(b) means for storing the digitized data samples to form a digital profile map of a longitudinal cross-section of at least a substantial portion of the repeat length of the web;

(c) means for processing the stored digitized data samples to determine the location of contrast changes which conform to predetermined conditions;

(d) means for determining at least one region of contrast change and control mark from the located contrast changes and storing a location at least one control mark and means for computing a comparator threshold value for at least one control mark responsive to minimum and maximum measured light levels within the associated contrast change region;

(e) means for detecting the location of at least one control mark for each successive repeat length responsive to the relationship between the comparator threshold value and the digitized data samples;

(f) means for measuring the difference between the stored location of at least one control mark and the detected location of the repeated control mark and for generating an error signal in response to said difference for each repeat length;

(g) means for driving the adjusting means to selectively advance or retard the position of the repeat lengths in response to the error signal.

15. The control system of claim 14 where the means for measuring comprises means for generating an error signal which indicate the magnitude of the measured difference and whether the control mark was detected before or after the stored location.

16. The control system of claim 14 further comprising first switching means for switching said control system between a manual and an automatic mode of operation, and second switching means, operatively connected to said adjusting means and effective to energize said adjusting means to advance or retard the web location to acquire a register condition while in manual mode.

17. The control system of claim 14 further comprising means for generating of time window of predetermined duration around each control mark initial location and for inhibiting detection of any control mark not within its respective time window.

18. The control system of claim 15 wherein the means for driving the adjusting means further comprises means for energizing a motor in a first direction when said control mark is advanced and in a second direction when said control mark is retarded, the energization occurring for a time that varies in proportion to the magnitude of the error signal.

19. The control system of claim 15 wherein the means for driving the adjusting means further comprise means for energizing a motor in a first direction when said control mark is advanced and in a second direction when said control mark is retarded, the energization occurring for a time that varies in response to a derivative function of the error signal.

20. The control system of claim 14 wherein the means for processing comprises means for determining slope values between maximum and minimum measured light levels in the contrast change region, and means for storing the location of at least one contrast change region in response to the slope value exceeding predetermined conditions.

21. The control system of claim 20 wherein the means for determining comprises means for identifying contrast change regions adjacent to the located and stored contrast change regions and for discarding any located and stored regions having adjacent regions within a predetermined time window while retaining as control marks at least one of the located and stored contrast change regions remaining.

22. The control system of claim 21 wherein the time window is programmable.

23. The control system of claim 14 wherein the means for determining further comprises means for comparing the scanner output for at least one additional repeat length to the comparator threshold during the corresponding time window for each control mark to detect the location of the control mark, and means for discarding those control marks which differ from their stored initial location in excess of a predetermined amount.

24. The control system of claim 23 further comprising means for activating the means for scanning, to obtain a new digital profile map to be further acted upon by the means for processing and means for determining in response to all control marks being discarded.

25. The control system of claim 21 wherein the means for determining further comprises means for monitoring the difference over successive repeat lengths between the detected location of retained control marks and the respective stored location of each control mark, and for discarding control marks in response to the difference until only a predetermined number of control marks remain.

26. The control system of claim 15 wherein the means for driving the adjusting means further comprises means for inhibiting the driving of the adjusting means in response to a measured difference being less than a predetermined minimum.

27. The control system of claim 15 wherein the means for measuring further comprises means for normalizing the measured difference in location and for displaying the normalized difference.

28. The control system of claim 14 further comprising direction means for automatically determining a primary direction of travel of the web in the web operating apparatus and a secondary direction of travel.

29. The control system of claim 16 further comprising means for allowing the second switching means to energize the adjusting means to advance or retard the web location while in the automatic mode to permit operator intervention.

30. The method system of claim 29 further comprising means for monitoring operator intervention during the automatic mode, and for discarding a control mark and initiating an acquisition of a new control mark in response to operator intervention exceeding a predetermined amount.

31. The control system of claim 14 further comprising means for monitoring the speed of the web operating apparatus and resetting the control system in response to the speed dropping below a predetermined minimum.

32. The control system of claim 14 further comprising means for monitoring the means for detecting and for resetting the control system in response to a failure to detect a control mark for a predetermined time period.

33. Apparatus for automatic control mark acquisition for a control system for maintaining a register condition for successive repeat lengths of a web in a web operating apparatus, comprising:

(a) means for optically scanning the web to produce an output, the output being representative of a longitudinal profile of indicia located on the web surface;

(b) means for sampling the scanning means output and for digitizing the samples to produce digital data;

(c) means for storing the digital data to form a digital profile map of a longitudinal profile of indicia located on the web surface for substantially an entire repeat length;

(d) means for processing the stored digital data to determine the location of indicia contrast changes which conform to predetermined conditions;

(e) means for determining at least one control mark from the located indicia contrast changes and for storing an initial location of each control mark.

34. The apparatus of claim 33 further comprising means for generating a time window of predetermined duration around each control mark initial location.

35. The apparatus of claim 33 wherein the means for processing comprises means for identifying regions of contrast change and for determining slope values between maximum and minimum detected light levels in the contrast change region, and means for storing the location of at least one contrast change region in response to the slope value exceeding predetermined conditions.

36. The apparatus of claim 35 wherein the means for determining comprises means for identifying contrast change regions adjacent to the located and stored contrast change regions and for discarding any located and stored regions having adjacent regions within a predetermined time window.

37. The apparatus of claim 36 further comprising means for computing a comparator threshold value for each control mark retained, responsive to the minimum and maximum light levels of the contrast change region of each respective control mark.

38. The apparatus of claim 37 wherein the means for determining further comprises means for comparing the scanning means output for at least one subsequent repeat length of the web to the comparator threshold during the corresponding time window for each control mark to detect the location of each control mark and means for discarding control marks which differ from their stored initial location in excess of a predetermined amount.

39. The apparatus of claim 37 wherein the means for determining further comprises means for comparing the scanning means output for a plurality of successive repeat lengths of the web to the comparator threshold during the corresponding time window for each control mark to detect the location of each control mark, and means for monitoring the difference between the detected location of each control mark and the respective stored location of each control mark and for discarding control marks in response to the difference.

40. Apparatus for automatic sensitivity adjustment of a scanner for use in a control system for controlling registration of a web in a web operating apparatus, comprising:

means for scanning the web and digitizing a cross-section of the web to produce a plurality of digital data samples;

means for storing the digital data samples;

means for processing the stored data samples to determine the location of contrast changes which conform to predetermined minimum conditions;

means for determining at least one control mark from the located contrast changes; and means for automatically determining a sensitivity threshold based upon the magnitude of the contrast change of at least one control mark.

41. The apparatus of claim 40 wherein the means for processing comprises means for identifying regions of contrast change and for determining slope values between maximum and minimum light levels in the contrast change regions, and means for storing the location of at least one contrast change region in response to the slope value exceeding predetermined conditions.

42. The apparatus of claim 41 wherein the means for determining comprises means for identifying contrast change regions adjacent to the located and stored contrast change regions and for discarding any located and stored regions having adjacent regions within a predetermined time window.

43. The apparatus of claim 40 wherein the means for setting a sensitivity threshold comprises means for computing a comparator threshold value for each control mark retained responsive to the minimum and maximum light level of the contrast change of each respective control mark.

44. A control system for use with an operating apparatus for automatically maintaining a register condition for successive repeat lengths of a sheet substrate having a signature thereon, said control system comprising:

(a) means for scanning the substrate to detect a reflected light level and to digitize into discrete digital samples the detected reflected light level to produce a scanner output and for storing scanner output digital samples representative of a longitudinal cross-sectional profile of the signature of the substrate for substantially an entire repeat length;

(b) means for processing at least a portion of the stored scanner output to generate reference control information from the longitudinal cross-sectional profile of the signature;

(c) means for storing at least a portion of the reference control information to provide stored reference control information;

(d) means for generating control signals responsive to the relationship between the stored reference control information and at least a portion of the scanner output.

45. The control system of claim 44 wherein the sheet substrate is a web and the operating apparatus is web printing apparatus.

46. The control system of claim 44 wherein the means for generating control signals generates said control signals responsive to the difference between at least a portion of the stored control information and at least a portion of the scanner output and wherein the control system further comprises means for controlling the operating apparatus for selectively advancing and for selecting retarding the successive repeat lengths of the substrate responsive to the control signals.

47. The control system of claim 45 wherein the means for processing comprises means for generating position information associated with the scanner output and means for generating the control information responsive to the scanner output and the position information.

48. The control system of claim 47 wherein the processing means further comprises means for identifying regions of contrast change and to determine slope values between maximum and minimum measured light levels in the contrast change region and means for storing the location of at least one contrast change region in response to the slope value exceeding predetermined conditions.

49. The control system of claim 48 further comprising digital means for storing the scanner output and position information.

50. The control system of claim 49 wherein the means for processing comprises a digital microprocessor.

51. The control system of claim 50 wherein the control information comprises at least a selected portion of the signature representing at least one control mark and position information associated therewith.

52. The control system of claim 50 wherein the means for scanning comprises an optical sensor which produces a scanner output which is an electrical signal representative of at least a portion of the image of the signature.

53. A method of acquiring and maintaining a register condition for successive repeat lengths of a web that is acted on by work applying means of a web operating apparatus which also has adjusting means for adjusting the position of said repeat lengths relative to said work applying means, comprising the steps of:

(a) scanning the web to produce a scanner output and digitizing the output into a plurality of successive data samples;

(b) storing the digitized data samples to form a digital map of a cross-section of the web image;

(c) processing the stored data points to determine the location of contrast changes which conform to predetermined conditions;

(d) determining a plurality of reference control marks from the located contrast changes and storing the location of each reference control mark;

(e) detecting the location of each control mark for each successive repeat length;

(f) measuring the difference between the stored location of at least one of said reference control marks and the detected location of the respective control mark and generating an error signal in response to said difference;

(g) driving the adjusting means to selectively advance or retard the position of the repeat lengths in response to the error signal.

54. The method of claim 53 wherein the step of determining further comprises measuring the difference between the stored location of each reference control mark and the detected location of the respective control mark for at least one additional repeat length to detect the location of each control mark and discard those reference control marks which differ from their stored location in excess of a predetermined amount.

55. The method of claim 8 wherein the method is repeated starting with the step of storing and digitizing in response to all reference control marks being discarded.

* * * * *

UNITED STATES PATENT AND TRADEMARK OFFICE

CERTIFICATE OF CORRECTION

PATENT NO. : 4,719,575

DATED : January 12, 1988

INVENTOR(S) : Herman C. Gnuechtel

It is certified that error appears in the above-identified patent and that said Letters Patent is hereby corrected as shown below:

Column 1, Line 9, change "means on" to --means acting on--.

Column 5, Line 61, change "it" to --is--.

Column 8, Line 24-25, change "between of the" to --between the--.

Column 9, Line 65, change "tiggers" to --triggers--.

Column 11, Line 61, change "ae" to --are--.

Column 12, Line 28, change "SW3 SW4" to --SW3, SW4--.

Column 65, Line 59, change "location at" to --location of at--.

Column 66, Line 3, change "repeated" to --respective--.

Column 66, Line 23, change "of" to --a--.

Column 69, Line 27, change "is web" to --is a web--.

UNITED STATES PATENT AND TRADEMARK OFFICE

CERTIFICATE OF CORRECTION

PATENT NO. : 4,719,575

DATED : January 12, 1988

INVENTOR(S) : Herman C. Gnuechtel

It is certified that error appears in the above-identified patent and that said Letters Patent is hereby corrected as shown below:

Column 69, Line 36, change "selecting" to --selectively--.

Signed and Sealed this

Eighth Day of August, 1989

*Attest:*

DONALD J. QUIGG

*Attesting Officer*

*Commissioner of Patents and Trademarks*